United States Patent
Lai et al.

(10) Patent No.: US 12,349,119 B2
(45) Date of Patent: Jul. 1, 2025

(54) METHOD AND DEVICE FOR PERFORMING LOGICAL-CHANNEL-BASED PRIORITIZATION

(71) Applicant: SHARP KABUSHIKI KAISHA, Osaka (JP)

(72) Inventors: Chia-Hsin Lai, Taipei (TW); Hai-Han Wang, Taipei (TW); Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 385 days.

(21) Appl. No.: 17/882,178

(22) Filed: Aug. 5, 2022

(65) Prior Publication Data

US 2023/0050524 A1 Feb. 16, 2023

Related U.S. Application Data

(60) Provisional application No. 63/260,057, filed on Aug. 6, 2021.

(51) Int. Cl.
*H04W 72/12* (2023.01)

(52) U.S. Cl.
CPC .................. *H04W 72/12* (2013.01)

(58) Field of Classification Search
CPC ............................ H04W 72/12; H04W 72/563
See application file for complete search history.

(56) References Cited

U.S. PATENT DOCUMENTS

| 11,778,610 | B2* | 10/2023 | Yang | H04W 72/569 |
| | | | | 370/329 |
| 12,120,673 | B2* | 10/2024 | Rossbach | H04W 72/1268 |
| 2022/0200762 | A1* | 6/2022 | Zhang | H04L 5/0053 |
| 2023/0209530 | A1* | 6/2023 | Rastegardoost | H04L 1/1854 |
| | | | | 370/329 |
| 2023/0345559 | A1* | 10/2023 | Li | H04W 72/02 |
| 2023/0403701 | A1* | 12/2023 | Salah | H04L 5/001 |
| 2024/0048288 | A1* | 2/2024 | Fakoorian | H04L 1/1822 |
| 2024/0322979 | A1* | 9/2024 | Marinier | H04L 1/1861 |

OTHER PUBLICATIONS

3GPP TS 38.211 V16.6.0 (Jun. 2021), 3rd Generation Partnership Project; Technical Specification Group Radio Access Network; NR; Physical channels and modulation (Release 16).

(Continued)

*Primary Examiner* — Abdullahi Ahmed
(74) *Attorney, Agent, or Firm* — ScienBiziP, P.C.

(57) ABSTRACT

A wireless communication method for performing logical-channel-based prioritization by a UE configured with a first IE relating to the logical-channel-based prioritization is provided. The wireless communication method includes: determining whether a PUCCH for an SR transmission overlaps a PUSCH; determining whether the UE is configured with a second IE relating to a simultaneous transmission function of the PUCCH for the SR transmission and the PUSCH; and in a case that the PUCCH for the SR transmission overlaps the PUSCH, performing the logical-channel-based prioritization according to at least one of: whether the UE is configured with the second IE, and a value of the second IE, if the UE is configured with the second IE.

4 Claims, 5 Drawing Sheets

(56) References Cited

OTHER PUBLICATIONS

3GPP TS 38.212 V16.6.0 (Jun. 2021), 3rd Generation Partnership Project; Technical Specification Group Radio Access Network; NR; Multiplexing and channel coding (Release 16).
3GPP TS 38.213 V16.6.0 (Jun. 2021), 3rd Generation Partnership Project; Technical Specification Group Radio Access Network; NR; Physical layer procedures for control (Release 16).
3GPP TS 38.214 V16.6.0 (Jun. 2021), 3rd Generation Partnership Project; Technical Specification Group Radio Access Network; NR; Physical layer procedures for data (Release 16).
3GPP TS 38.331 V16.5.0 (Jun. 2021), 3rd Generation Partnership Project; Technical Specification Group Radio Access Network; NR; Radio Resource Control (RRC) protocol specification (Release 16).

* cited by examiner

METHOD AND DEVICE FOR PERFORMING LOGICAL-CHANNEL-BASED PRIORITIZATION

CROSS-REFERENCE TO RELATED APPLICATION(S)

The present disclosure claims the benefit of and priority to U.S. Provisional Patent Application Ser. No. 63/260,057, filed on Aug. 6, 2021, entitled "METHOD AND APPARATUS TO SUPPORT SIMULTANEOUS PUCCH AND PUSCH TRANSMISSION," the content of which is hereby incorporated fully by reference into the present disclosure for all purposes.

FIELD

The present disclosure generally relates to wireless communication and, more particularly, to methods and devices for performing logical-channel-based prioritization.

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to methods and devices for performing logical-channel-based prioritization.

According to a first aspect of the present disclosure, a wireless communication method for performing logical-channel-based prioritization by a User Equipment (UE) configured with a first Information Element (IE) relating to the logical-channel-based prioritization is provided. The wireless communication method includes: determining whether a Physical Uplink Control Channel (PUCCH) for a Scheduling Request (SR) transmission overlaps a Physical Uplink Shared Channel (PUSCH); determining whether the UE is configured with a second IE relating to a simultaneous transmission function of the PUCCH for the SR transmission and the PUSCH; and in a case that the PUCCH for the SR transmission overlaps the PUSCH, performing the logical-channel-based prioritization according to at least one of: whether the UE is configured with the second IE, and a value of the second IE if the UE is configured with the second IE.

In some implementations of the first aspect of the present disclosure, the wireless communication method further includes in a case that the UE is configured with the second IE, performing the logical-channel-based prioritization at least by: considering the PUSCH as a prioritized uplink grant, and considering the SR transmission as a prioritized SR transmission.

In some implementations of the first aspect of the present disclosure, the value of the second IE is set to enable the simultaneous transmission function.

In some implementations of the first aspect of the present disclosure, the wireless communication method further includes determining that a logical channel priority that triggers the SR transmission is lower than a logical channel priority of the PUSCH in the case that the PUCCH for the SR transmission overlaps the PUSCH.

In some implementations of the first aspect of the present disclosure, the wireless communication method further includes in a case that the UE is not configured with the second IE, performing the logical-channel-based prioritization at least by: considering the PUSCH as a prioritized uplink grant, and considering the SR transmission as a deprioritized SR transmission.

In some implementations of the first aspect of the present disclosure, the wireless communication method further includes in a case that the UE is configured with the second IE, and the value of the second IE is set to disable the simultaneous transmission function, performing the logical-channel-based prioritization at least by: considering the PUSCH as a prioritized uplink grant, and considering the SR transmission as a deprioritized SR transmission.

In some implementations of the first aspect of the present disclosure, the first IE includes an IE denoted as lch-basedpriorization.

In some implementations of the first aspect of the present disclosure, the second IE includes an IE denoted as simultaneousPUCCH-PUSCH.

In some implementations of the first aspect of the present disclosure, the wireless communication method further includes receiving a Radio Resource Control (RRC) message that configures the UE with the second IE.

According to a second aspect of the present disclosure, a User Equipment (UE) configured with a first Information Element (IE) relating to logical-channel-based prioritization is provided. The UE includes at least one processor and at least one memory coupled to the at least one processor. The at least one memory stores a set of computer-executable programs that when executed by the at least one processor causes the UE to perform operations including: determining whether a Physical Uplink Control Channel (PUCCH) for a Scheduling Request (SR) transmission overlaps a Physical Uplink Shared Channel (PUSCH); determining whether the UE is configured with a second IE relating to a simultaneous transmission function of the PUCCH for the SR transmission and the PUSCH; and in a case that the PUCCH for the SR transmission overlaps the PUSCH, performing the logical-channel-based prioritization according to at least one of: whether the UE is configured with the second IE, and a value of the second IE if the UE is configured with the second IE.

In some implementations of the second aspect of the present disclosure, the operations further include: in a case that the UE is configured with the second IE, performing the logical-channel-based prioritization at least by: considering the PUSCH as a prioritized uplink grant, and considering the SR transmission as a prioritized SR transmission.

In some implementations of the second aspect of the present disclosure, the value of the second IE is set to enable the simultaneous transmission function.

In some implementations of the second aspect of the present disclosure, the operations further include: determining that a logical channel priority that triggers the SR transmission is lower than a logical channel priority of the PUSCH in the case that the PUCCH for the SR transmission overlaps the PUSCH.

In some implementations of the second aspect of the present disclosure, the operations further include: in a case that the UE is not configured with the second IE, performing the logical-channel-based prioritization at least by: considering the PUSCH as a prioritized uplink grant, and considering the SR transmission as a deprioritized SR transmission.

In some implementations of the second aspect of the present disclosure, the operations further include: in a case that the UE is configured with the second 1E, and the value of the second IE is set to disable the simultaneous transmission function, performing the logical-channel-based prioritization at least by: considering the PUS CH as a prioritized uplink grant, and considering the SR transmission as a deprioritized SR transmission.

In some implementations of the second aspect of the present disclosure, the first IE includes an IE denoted as lch-basedpriorization.

In some implementations of the second aspect of the present disclosure, the second IE includes an IE denoted as simultaneousPUCCH-PUSCH.

In some implementations of the second aspect of the present disclosure, the operations further include: receiving a Radio Resource Control (RRC) message that configures the UE with the second IE.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
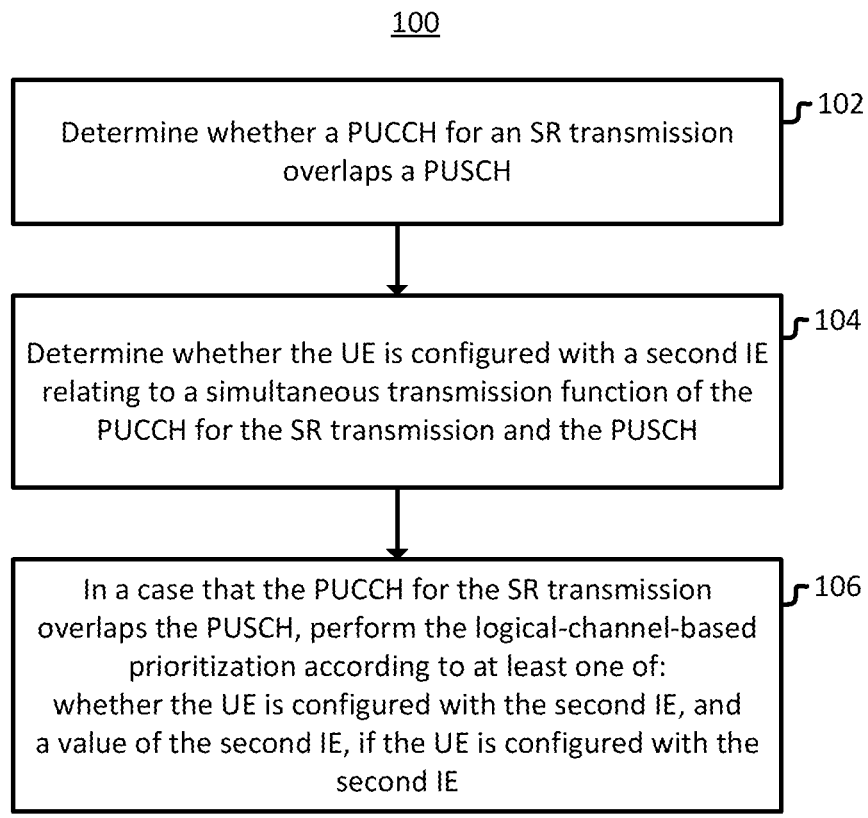
FIG. 1 is a flowchart of a wireless communication method for performing logical-channel-based prioritization by a UE configured with a first IE relating to the logical-channel-based prioritization, according to an example implementation of the present disclosure.

At least some of the acronyms in the present application are defined as follows and, unless otherwise specified, the acronyms have the following meanings:

| Acronym | Full name |
| --- | --- |
| ACK | Acknowledgement |
| BA | Bandwidth Adaptation |
| BS | Base Station |
| BSR | Buffer Status Report |

-continued

| Acronym | Full name |
| --- | --- |
| BWP | Bandwidth Part |
| CA | Carrier Aggregation |
| CCCH | Common Control Channel |
| CE | Control Element |
| CH | Channel |
| CORESET | Control Resource Set |
| CSS | Common Search Space |
| CSI | Channel State Information |
| DAI | Downlink Assignment Index |
| DCI | Downlink Control Information |
| DCP | DCI with CRC scrambled by PS-RNTI |
| DL | Downlink |
| DRX | Discontinuous Reception |
| HARQ | Hybrid Automatic Repeat Request |
| HP | High Priority |
| ID | Identification |
| LBT | Listen Before Talk |
| LCH | Logical Channel |
| LP | Low Priority |
| LSB | Least Significant Bit |
| LRR | Link Recovery Request |
| MAC | Medium Access Control |
| MCG | Master Cell Group |
| MSB | Most Significant Bit |
| NR-U | New Radio Unlicensed |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PHY | Physical |
| PRB | Physical Resource Block |
| PSFCH | Physical Sidelink Feedback Channel |
| PUCCH | Physical Uplink Control Channel |
| PUSCH | Physical Uplink Shared Channel |
| RAR | Random Access Response |
| RE | Resource Element |
| Rel- | Release |
| RLC | Radio Link Control |
| RRC | Radio Resource Control |
| SCS | Subcarrier Spacing |
| SDAP | Service Data Adaptation Protocol |
| SL | Sidelink |
| SPS | Semi-Persistent Scheduling |
| SP-CSI | Semi-Persistent Channel State Information |
| SR | Scheduling Request |
| SS | Search Space |
| SSSG | Search Space Set Group |
| TRP | Transmission Reception Point |
| UCI | Uplink Control Information |
| UE | User Equipment |
| UL | Uplink |
| UL-SCH | Uplink Shared Channel |
| USS | UE-specific search space |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "In some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or using one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network, such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UNITS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

Some multiplexing procedures and rules while PUCCHs and/or PUSCHs with different or the same priority overlapping are provided in the present disclosure.

UE Procedure for Reporting Control Information

When a UE determines overlapping for PUCCH transmissions with SL HARQ-ACK reports and PUCCH of larger and/or smaller priority index, the UE resolves the overlapping for PUCCH transmissions with SL HARQ-ACK reports and PUCCH of each priority index before resolving the overlapping for PUCCH transmissions without SL HARQ-ACK or the overlapping for PUCCH transmissions and PUSCH transmissions.

When a UE determines overlapping for PUCCH and/or PUSCH transmissions of different priority indexes other than PUCCH transmissions with SL HARQ-ACK reports before considering limitations for UE transmission, including repetitions, if any, the UE may first resolve the overlapping for PUCCH and/or PUSCH transmissions of smaller priority index.

If a transmission of a first PUCCH of larger priority index scheduled by a DCI format in a PDCCH reception would overlap in time domain with a repetition of a transmission of a second PUSCH or a second PUCCH of smaller priority index, the UE may cancel the repetition of a transmission of the second PUSCH or the second PUCCH before the first symbol that would overlap with the first PUCCH transmission.

If a transmission of a first PUSCH of larger priority index scheduled by a DCI format in a PDCCH reception would overlap in time domain with a repetition of the transmission of a second PUCCH of smaller priority index, the UE may cancel the repetition of the transmission of the second PUCCH before the first symbol that would overlap with the first PUSCH transmission.

The overlapping (e.g., the overlapping for PUCCH and/or PUSCH transmissions) may be applicable before or after resolving overlapping among channels of larger priority index, if any. Any remaining PUCCH and/or PUSCH transmission after overlapping resolution may be subjected to the limitations for UE transmission. Further, the UE may expect that the transmission of the first PUCCH or the first PUSCH, respectively, would not start before $T_{proc,2}$ after a last symbol of the corresponding PDCCH reception, where $T_{proc,2}$ is the PUSCH preparation time for a corresponding UE processing capability assuming $d_{2,1}=d_1$ (as described in Technical Specification (TS) 38.214 v16.6.0), based on $\mu$ and $N_2$, and $d_1$ is determined by a reported UE capability.

If a UE is scheduled by a DCI format in a first PDCCH reception to transmit a first PUCCH or a first PUSCH of larger priority index that overlaps with a second PUCCH or a second PUSCH transmission of smaller priority index that, if any, is scheduled by a DCI format in a second PDCCH, $T_{proc,2}$ is based on a value of $\mu$ corresponding to the smallest SCS configuration of the first PDCCH, the second PDCCHs, the first PUCCH, or the first PUSCH, and the second PUCCHs or the second PUSCHs,
  if the overlapping group includes the first PUCCH,
    if processingType2Enabled of PDSCH-ServingCell-Config is set to enable for the serving cell where the UE receives the first PDCCH and for all serving cells where the UE receives the PDSCHs corresponding to the second PUCCHs, and if processingType2Enabled of PUSCH-ServingCell-Config is set to enable for the serving cells with the second PUSCHs, $N_2$ is 5 for $\mu=0$, 5.5 for $\mu=1$, and 11 for $\mu=2$,
    else, $N_2$ is 10 for $\mu=0$, 12 for $\mu=1$, 23 for $\mu=2$, and 36 for $\mu=3$;
  if the overlapping group includes the first PUSCH,
    if processingType2Enabled of PUSCH-ServingCell-Config is set to enable for the serving cells with the first PUSCH and the second PUSCHs and if processingType2Enabled of PDSCH-ServingCell-Config is set to enable for all serving cells where the UE receives the PDSCHs corresponding to the second PUCCHs, $N_2$ is 5 for $\mu=0$, 5.5 for $\mu=1$, and 11 for $\mu=2$
    else, $N_2$ is 10 for $\mu=0$, 12 for $\mu=1$, 23 for $\mu=2$, and 36 for $\mu=3$.

If a UE would transmit certain channels, including repetitions, if any, that would overlap in time domain, the UE may be expected to cancel a repetition of the PUCCH/PUSCH transmissions of smaller priority index before the first symbol overlapping with the PUCCH/PUSCH transmission of larger priority index if the repetition of the PUCCH/PUSCH transmissions of smaller priority index would overlap in time domain with the PUCCH/PUSCH transmissions of larger priority index.

The channels described above include at least one of the following:
  a first PUCCH of larger priority index with SR and a second PUCCH or PUSCH of smaller priority index, or
  a configured grant PUSCH of larger priority index and a PUCCH of smaller priority index, or
  a first PUCCH of larger priority index with HARQ-ACK information only in response to a PDSCH reception without a corresponding PDCCH, and a second PUCCH of smaller priority index with SR and/or CSI, or a configured grant PUSCH with smaller priority index, or a PUSCH of smaller priority index with SP-CSI report(s) without a corresponding PDCCH, or
  a PUSCH of larger priority index with SP-CSI reports(s) without a corresponding PDCCH and a PUCCH of smaller priority index with SR, or CSI, or HARQ-ACK information only in response to a PDSCH reception without a corresponding PDCCH, or
  a configured grant PUSCH of larger priority index and a configured PUSCH of lower priority index on a same serving cell.

When a UE determines overlapping for PUCCH transmissions with SL HARQ-ACK reports and PUSCH of smaller priority index, including repetitions, if any, after resolving the overlapping PUCCH other than PUCCH transmissions with SL HARQ-ACK reports and/or PUSCH transmissions, if the PUSCH includes no UCI, the UE may resolve the overlapping for PUCCH transmissions with SL HARQ-ACK reports and PUSCH of smaller priority index.

When a UE determines overlapping for PUCCH transmissions with SL HARQ-ACK reports and PUSCH of larger priority index only, including repetitions, if any, after resolving the overlapping PUCCH other than PUCCH transmissions with SL HARQ-ACK reports and/or PUSCH transmissions, the UE does not transmit the PUCCH with SL HARQ-ACK reports.

Further, the UE may expect that the transmission of the PUSCH would not start before $T_{proc,2}+d_1$ after a last symbol of the corresponding PDCCH reception, where $T_{proc,2}$ is the PUSCH preparation time for a corresponding UE processing capability assuming $d_{2,1}=0$ (described in TS 38.214 v16.6.0), based on $\mu$ and $N_2$, and $d_1$ is determined by a reported UE capability.

The UE may expect that the PUCCH and PUSCH transmissions fulfill the conditions for UCI multiplexing replacing the reference time of "end of PDSCH" with "end of the last symbol of a last PSFCH reception occasion" and $T_{proc,1}$ with $T_{prep}$.

A UE may not expect that a PUCCH carrying SL HARQ-ACK reports overlaps with a PUSCH with aperiodic or semi-persistent CSI reports.

A UE may not expect to be scheduled to transmit a PUCCH or a PUSCH with smaller priority index that would overlap in time domain with a PUCCH of larger priority index with HARQ-ACK information only in response to a PDSCH reception without a corresponding PDCCH. A UE may not expect to be scheduled to transmit a PUCCH of smaller priority index that would overlap in time domain with a PUSCH of larger priority index with SP-CSI report(s) without a corresponding PDCCH.

A UE may multiplex UCIs with the same priority index in a PUCCH or a PUSCH before considering limitations for UE transmission. A PUCCH or a PUSCH is assumed to have a same priority index as a priority index of UCIs a UE multiplexes in the PUCCH or the PUSCH.

The multiplexing or prioritization for overlapping channels are for overlapping channels with the same priority index or for overlapping channels with a PUCCH carrying SL HARQ-ACK information.

If a UE is provided subslotLengthForPUCCH, a slot for an associated PUCCH resource of a PUCCH transmission with HARQ-ACK information includes a number of symbols indicated by subslotLengthForPUCCH.

If a UE would transmit on a serving cell a PUSCH without UL-SCH that overlaps with a PUCCH transmission on a serving cell that includes positive SR information, the UE may not transmit the PUSCH.

If a UE would transmit CSI reports on overlapping physical channels, the UE may apply the priority rules described in TS 38.214 v16.6.0 for the multiplexing of CSI reports.

If a UE has overlapping resources for PUCCH transmissions in a slot and at least one of the PUCCH transmissions is with repetitions over multiple slots, the UE first follows the procedures for resolving the overlapping among the resources for the PUCCH transmissions.

If a UE would multiplex UCI in a PUCCH transmission that overlaps with a PUSCH transmission, and the PUSCH and PUCCH transmissions fulfill the conditions for UCI multiplexing, the UE may multiplex only HARQ-ACK information, if any, from the UCI in the PUSCH transmission and does not transmit the PUCCH if the UE multiplexes aperiodic or semi-persistent CSI reports in the PUSCH; and/or multiplex only HARQ-ACK information and CSI reports, if any, from the UCI in the PUSCH transmission and does not transmit the PUCCH if the UE does not multiplex aperiodic or semi-persistent CSI reports in the PUSCH.

A UE may not expect to multiplex in a PUSCH transmission in one slot with SCS configuration $\mu_1$ UCI of the same type that the UE would transmit in PUCCHs in different slots with SCS configuration $\mu_2$ if $\mu_1 < \mu_2$.

A UE may not expect to multiplex in a PUSCH transmission or in a PUCCH transmission HARQ-ACK information that the UE would transmit in different PUCCHs.

A UE may not expect a PUCCH resource that results from multiplexing overlapped PUCCH resources, if applicable, to overlap with more than one PUSCH if each of the more than one PUSCH includes aperiodic CSI reports.

A UE may not expect to detect a DCI format scheduling a PDSCH reception or an SPS PDSCH release, a DCI format 1_1 indicating SCell dormancy, or a DCI format including a One-shot HARQ-ACK request field with value 1, and indicating a resource for a PUCCH transmission with corresponding HARQ-ACK information in a slot if the UE previously detects a DCI format scheduling a PUSCH transmission in the slot and if the UE multiplexes HARQ-ACK information in the PUSCH transmission.

If a UE multiplexes aperiodic CSI in a PUSCH, and the UE would multiplex UCI that includes HARQ-ACK information in a PUCCH that overlaps with the PUSCH, and the timing conditions (as described in the 3GPP TS 38.213 v16.6.0, section 9.2.5) for overlapping PUCCHs and PUSCHs are fulfilled, the UE may multiplex only the HARQ-ACK information in the PUSCH and does not transmit the PUCCH.

If a UE transmits multiple PUSCHs in a slot on respective serving cells that include first PUSCHs that are scheduled by DCI formats and second PUSCHs configured by respective ConfiguredGrantConfig or semiPersistentOnPUSCH, and the UE would multiplex UCI in one of the multiple PUSCHs, and the multiple PUSCHs fulfil the conditions for UCI multiplexing, the UE may multiplex the UCI in a PUSCH from the first PUSCHs.

If a UE transmits multiple PUSCHs in a slot on respective serving cells, and the UE would multiplex UCI in one of the multiple PUSCHs, and the UE does not multiplex aperiodic CSI in any of the multiple PUSCHs, the UE may multiplex the UCI in a PUSCH of the serving cell with the smallest ServCellIndex subject to the conditions for UCI multiplexing being fulfilled. If the UE transmits more than one PUSCHs in the slot on the serving cell with the smallest ServCellIndex that fulfil the conditions for UCI multiplexing, the UE may multiplex the UCI in the earliest PUSCH that the UE transmits in the slot.

If a UE transmits a PUSCH over multiple slots, and the UE would transmit a PUCCH with HARQ-ACK and/or CSI information over a single slot that overlaps with the PUSCH transmission in one or more slots of the multiple slots, and the PUSCH transmission in the one or more slots fulfills the conditions for multiplexing the HARQ-ACK and/or CSI information, the UE may multiplex the HARQ-ACK and/or CSI information in the PUSCH transmission in the one or more slots. The UE does not multiplex HARQ-ACK and/or CSI information in the PUSCH transmission in a slot from the multiple slots if the UE would not transmit a single-slot PUCCH with HARQ-ACK and/or CSI information in the slot in case the PUSCH transmission was absent.

If a UE transmits a PUSCH with repetition Type B, and the UE would transmit a PUCCH with HARQ-ACK and/or CSI information over a single slot that overlaps with the PUSCH transmission in one or more slots, the UE expects all actual repetitions of the PUSCH transmission (e.g., as described in TS 38.214 v16.6.0) that would overlap with the PUCCH transmission to fulfill the conditions for multiplexing the HARQ-ACK and/or CSI information, and the UE multiplexes the HARQ-ACK and/or CSI information in the earliest actual PUSCH repetition of the PUSCH transmission that would overlap with the PUCCH transmission and includes more than one symbol. The UE does not expect that all actual repetitions that would overlap with the PUCCH transmission do not include more than one symbol.

If the PUSCH transmission over the multiple slots is scheduled by a DCI format that includes a DAI field, the value of the DAI field is applicable for multiplexing HARQ-ACK information in the PUSCH transmission in any slot from the multiple slots where the UE multiplexes HARQ-ACK information.

When a UE would multiplex HARQ-ACK information in a PUSCH transmission that is configured by a ConfiguredGrantConfig and includes CG-UCI (e.g., as described in TS 38.212 v16.6.0), the UE may multiplex the HARQ-ACK information in the PUSCH transmission if the UE is provided cg-UCI-Multiplexing; otherwise, the UE does not transmit the PUSCH and multiplexes the HARQ-ACK information in a PUCCH transmission or in another PUSCH transmission.

UE Procedure for Reporting Multiple UCI Types

If a UE would transmit multiple PUCCHs in a slot that include HARQ-ACK information, and/or SR, and/or CSI reports, and any PUCCH with HARQ-ACK information in the slot satisfies the above timing conditions and does not overlap with any other PUCCH or PUSCH in the slot that does not satisfy the above timing conditions, the UE may multiplex the HARQ-ACK information, and/or SR, and/or CSI reports and determines corresponding PUCCH(s) for transmission in the slot according to the following pseudo-code. If the multiple PUCCHs do not include HARQ-ACK information and do not overlap with any PUSCH transmission by the UE in response to a DCI format detection by the UE, the timing conditions do not apply.

A UE may perform certain actions if at least one of the following conditions (1) to (4) is fulfilled:
 (1) a UE is not provided multi-CSI-PUCCH-ResourceList, and
 (2) a resource for a PUCCH transmission with HARQ-ACK information in response to SPS PDSCH reception and/or a resource for a PUCCH associated with a SR occasion overlap in time domain with two resources for respective PUCCH transmissions with two CSI reports, and
 (3) there is no resource for a PUCCH transmission with HARQ-ACK information in response to a DCI format detection that overlaps in time domain with any of the previous resources, and
 (4) the following pseudo code (provided in Table 1) results in the UE attempting to determine a single PUCCH resource from the HARQ-ACK and/or the SR resource and the two PUCCH resources with CSI reports.

The actions may include at least one of the following actions (1) and (2):
 (1) multiplexing the HARQ-ACK information and/or the SR in the resource for the PUCCH transmission with the CSI report having the higher priority; and
 (2) not transmitting the PUCCH with the CSI report having the lower priority.

An example of a procedure represented by the pseudo code is provided in Table 1.

TABLE 1

```
Set Q to the set of resources for transmission of corresponding
PUCCHs in a single slot without repetitions where
- a resource with earlier first symbol is placed
before a resource with later first symbol
- for two resources with same first symbol,
the resource with longer duration is placed
 before the resource with shorter duration
- for two resources with same first symbol and
same duration, the placement is arbitrary
  - the above three steps for the set Q are according to a
  subsequent pseudo-code for a function order(Q)
- a resource for negative SR transmission that does not overlap with a
 resource for HARQ-ACK or CSI transmission is excluded from set Q
- if the UE is not provided simultaneousHARQ-ACK-CSI
 and resources for transmission of HARQ-ACK
 information include PUCCH format 0 or PUCCH format 2, resources
 that include PUCCH format 2, or PUCCH format 3, or PUCCH
 format 4 for transmission of CSI reports are excluded
 from the set Q if they overlap with any
 resource from the resources for transmission of HARQ-ACK information
- if the UE is not provided simultaneousHARQ-ACK-CSI and at least one
 of the resources for transmission of HARQ-ACK information includes
 PUCCH format 1, PUCCH format 3, or PUCCH format 4
 - resources that include PUCCH format 3 or PUCCH format 4 for
  transmission of CSI reports are excluded from the set Q
 - resources that include PUCCH format 2 for transmission of CSI
  reports are excluded from the set Q if they overlap with any
   resource from the resources for transmission
   of HARQ-ACK information
Set c(Q) to the cardinality of Q
Set Q(j,0) to be the first symbol of resource Q(j) in the slot
Set L(Q(j)) to be the number of symbols of resource Q(j) in the slot
Set j = 0 - index of first resource in set Q
Set o=0 - counter of overlapped resources
while j ≤ c(Q)-1
 if j < c(Q)-1 and resource Q(j - o) overlaps with resource Q(j + 1)
  o=o+1
  j=j + 1
  else
  if o>0
   determine a single resource for multiplexing
   UCI associated with resources
    {Q(j - o),Q(j - o + 1),...,Q(j)}
   set the index of the single resource to j
   Q = Q \ {Q(j - o), Q(j - o + 1),..., Q(j - 1)}
  ʲ⁻ᵒ % start from the beginning after reordering
  unmerged resources at next step
  ʲ⁻ᵒ o=0
 ᵒʳᵈᵉʳ⁽Q⁾ % function that re-orders resources in current set Q
 ᵒʳᵈᵉʳ⁽Q⁾ Set c(Q) to the cardinality of Q
```

TABLE 1-continued

```
  else
    j = j + 1
  end if
 end if
end while
The function order(Q) performs the following pseudo-code
{
 k=0
 while k < c(Q)-1 % the next two while loops are to
 re-order the unmerged resources
  l=0
  while l < c(Q)-1-k
   if Q(l,0) > Q(l+1,0) OR (Q(l,0)=Q(l+1,0)&L(Q(l))<L(Q(l+1)))
     temp=Q(l)
     Q(l)=Q(l + 1)
     Q(l + 1) = temp
   end if
   l=l+1
  end while
  k=k+1
 end while
}
```

For each PUCCH resource in the set Q that satisfies the aforementioned timing conditions, when applicable, the UE transmits a PUCCH using the PUCCH resource if the PUCCH resource does not overlap in time domain with a PUSCH transmission after multiplexing UCI following the procedures;

the UE multiplexes HARQ-ACK information and/or CSI reports in a PUSCH if the PUCCH resource would overlap in time domain with a PUSCH transmission, and does not transmit SR. In case the PUCCH resource overlaps in time domain with multiple PUSCH transmissions, the PUSCH for multiplexing HARQ-ACK information and/or CSI is selected. If the PUSCH transmission by the UE is not in response to a DCI format detection and the UE multiplexes only CSI reports, the timing conditions are not applicable; and/or the UE does not expect the resource to overlap with a second resource of a PUCCH transmission over multiple slots if the resource is obtained from a group of resources that do not overlap with the second resource.

The following assumptions (1) to (3) may be applicable for some implementations of the present disclosure:

(1) resources for transmissions of UCI types, prior to multiplexing or dropping, overlap in a slot;

(2) multiplexing conditions of corresponding UCI types in a single PUCCH are satisfied, and (3) the UE does not transmit any PUSCH time-overlapping with PUCCH in the slot.

UE Procedure for Multiplexing HARQ-ACK or CSI and SR in a PUCCH

If a UE would transmit SR in a resource using PUCCH format 0 and HARQ-ACK information bits in a resource using PUCCH format 1 in a slot, the UE may transmit only a PUCCH with the HARQ-ACK information bits in the resource using PUCCH format 1.

If the UE would transmit positive SR in a first resource using PUCCH format 1 and at most two HARQ-ACK information bits in a second resource using PUCCH format 1 in a slot, the UE may transmit a PUCCH with HARQ-ACK information bits in the first resource using PUCCH format 1. If a UE would not transmit a positive SR in a resource using PUCCH format 1 and would transmit at most two HARQ-ACK information bits in a resource using PUCCH format 1 in a slot, the UE may transmit a PUCCH in the resource using PUCCH format 1 for HARQ-ACK information.

If a UE would transmit a PUCCH with $O_{ACK}$ HARQ-ACK information bits in a resource using PUCCH format 2 or PUCCH format 3 or PUCCH format 4 in a slot, $\lceil \log_2(K+1) \rceil$ bits representing a negative or positive SR, in ascending order of the values of schedulingRequestResourceId, a schedulingRequestResourceId associated with schedulingRequestID-BFR-SCell, and a schedulingRequestResourceId associated with schedulingRequestID-LBT-SCell, are appended to the HARQ-ACK information bits, and the UE transmits the combined $O_{UCI}=O_{ACK}+\lceil \log_2(K+1) \rceil$ UCI bits in a PUCCH using a resource with PUCCH format 2 or PUCCH format 3 or PUCCH format 4 that the UE determines. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

If a UE would transmit a PUCCH with $O_{CSI}$ CSI report bits in a resource using PUCCH format 2 or PUCCH format 3 or PUCCH format 4 in a slot, $\lceil \log_2(K+1) \rceil$ bits representing corresponding negative or positive SR, in ascending order of the values of schedulingRequestResourceId, a schedulingRequestResourceId associated with schedulingRequestID-BFR-SCell, and a schedulingRequestResourceId associated with schedulingRequestID-LBT-Scell, are prepended to the CSI information bits, and the UE transmits a PUCCH with the combined $O_{UCI}=\lceil \log_2(K+1) \rceil+O_{CSI}$ UCI bits in a resource using the PUCCH format 2 or PUCCH format 3 or PUCCH format 4 for CSI reporting. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

If a UE transmits a PUCCH with $O_{ACK}$ HARQ-ACK information bits, $O_{SR}=\lceil \log_2(K+1) \rceil$ SR bits, and $O_{CRC}$ CRC bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs provided respectively by nrofPRBs in PUCCH-format2 or nrofPRBs in PUCCH-format3 and starts from the first PRB from the number of PRBs, that results in $(O_{ACK}+O_{SR}+O_{CRC}) \leq M_{RB,min}^{PUCCH} \cdot N_{sc,ctrl}^{RB} \cdot N_{symb-UCI}^{PUCCH} \cdot Q_m \cdot r$ and, if $M_{RB}^{PUCCH}>1$, $(O_{ACK}+O_{SR}+O_{CRC})>(M_{RB,min}^{PUCCH}-1) \cdot N_{sc,ctrl}^{RB} \cdot N_{symb-UCI}^{PUCCH} \cdot Q_m \cdot r$, where $N_{sc,ctrl}^{RB}$, $N_{symb-UCI}^{PUCCH}$, $Q_m$, and r are defined in 3GPP TS 38.213 v16.6.0. For PUCCH format 3, if $M_{RB,min}^{PUCCH}$ is not equal to $2^{\alpha_2} \cdot 3^{\alpha_3} \cdot 5^{\alpha_5}$ (e.g., as described in TS 38.211 v16.6.0), $M_{RB,min}^{PUCCH}$ is increased to the nearest allowed value of nrofPRBs for PUCCH-format3 (e.g., as described in TS 38.331 v16.5.0). If $(O_{ACK}+O_{SR}+O_{CRC}) > (M_{RB,min}^{PUCCH}-1) \cdot N_{sc,ctrl}^{RB} \cdot N_{symb-UCI}^{PUCCH} \cdot Q_m \cdot r$, the UE transmits the PUCCH over the $M_{RB}^{PUCCH}$ PRBs.

If a UE is provided a first interlace of $M_{Interlace,0}^{PUCCH}$ PRBs by interlace0 in InterlaceAllocation and transmits a PUCCH with $O_{ACK}$ HARQ-ACK information bits, $O_{SR} = \lceil \log_2(K+1) \rceil$ SR bits, and $O_{CRC}$ CRC bits using PUCCH format 2 or PUCCH format 3, the UE transmits the PUCCH over the first interlace if $(O_{ACK}+O_{SR}+O_{CRC}) \leq M_{RB,min}^{PUCCH} \cdot N_{sc,ctrl}^{RB} \cdot N_{symb-UCI}^{PUCCH} \cdot Q_m \cdot r$; otherwise, if the UE is provided a second interlace by interlace1 in PUCCH-format2 or PUCCH-format3, the UE transmits the PUCCH over the first and second interlaces.

Search Space Configuration Parameters

For a transmission occasion of a single CSI report, a PUCCH resource is provided by pucch-CSI-ResourceList. For a transmission occasion of multiple CSI reports, corresponding PUCCH resources can be provided by multi-CSI-PUCCH-ResourceList. If a UE is provided first and second PUCCH-Config, multi-CSI-PUCCH-ResourceList is provided by the first PUCCH-Config, and PUCCH-ResourceId in pucch-CSI-ResourceList or multi-CSI-PUCCH-ResourceList indicates a corresponding PUCCH resource in PUCCH-Resource provided by the first PUCCH-Config.

If a UE is provided only one PUCCH resource set for transmission of HARQ-ACK information in response to PDSCH reception scheduled by a DCI format or in response to an SPS PDSCH release or in response to a SCell dormancy indication, the UE does not expect to be provided simultaneousHARQ-ACK-CSI.

A UE may be configured, by maxCodeRate, with a code rate for multiplexing HARQ-ACK, SR, and CSI report(s) in a PUCCH transmission using PUCCH format 2, PUCCH format 3, or PUCCH format 4.

If a UE transmits CSI reports using PUCCH format 2, the UE transmits only wideband CSI for each CSI report (e.g., as described in TS 38.214 v16.6.0). In the following, a Part 1 CSI report refers either to a CSI report with only wideband CSI or to a Part 1 CSI report with wideband CSI and sub-band CSI.

Parameter(s) may be denoted as:

$O_{ACK}$ is a total number of HARQ-ACK information bits, if any;

$O_{SR}$ is a total number of SR bits. $O_{SR}=0$ if there is no scheduling request bit; otherwise, $O_{SR} \lceil \log_2(K+1) \rceil$;

$$O_{CSI} = \sum_{n=1}^{N_{CSI}^{total}} (O_{CSI-part1,n} + O_{CSI-part2,n}),$$

where $O_{CSI-part1,n}$ is a number of Part 1 CSI report bits for CSI report with priority value n, $O_{CSI-part2,n}$ is a number of Part 2 CSI report bits, if any, for CSI report with priority value n (e.g., as described in TS 38.214 v16.6.0), and $N_{CSI}^{total}$ is a number of CSI reports that include overlapping CSI reports; and $O_{CRC} = O_{CRC,CSI-part1} + O_{CRC,CSI-part2}$, where $O_{CRC,CSI-part1}$ is a number of CRC bits, if any, for encoding HARQ-ACK, SR and Part 1 CSI report bits and $O_{CRC,CSI-part2}$ is a number of CRC bits, if any, for encoding Part 2 CSI report bits.

In the following:

r is a code rate given by maxCodeRate as in Table 2;

$M_{RB}^{PUCCH}$ is a number of PRBs for PUCCH format 2, or PUCCH format 3, or PUCCH format 4, respectively, where $M_{RB}^{PUCCH}$ is provided by nrofPRBs in PUCCH-format2 for PUCCH format 2 or by nrofPRBs in PUCCH-format3 for PUCCH format 3, and $M_{RB}^{PUCCH}=1$ for PUCCH format 4;

$N_{sc,ctrl}^{RB} = R_{sc}^{RB} - 4$ for PUCCH format 2 or, if the PUCCH resource with PUCCH format 2 includes an orthogonal cover code with length $N_{SF}^{PUCCH,2}$ provided by occ-Length, $N_{sc,ctrl}^{RB} = (N_{sc}^{RB}-4)/N_{SF}^{PUCCH,2}$, $N_{sc,ctrl}^{RB} = N_{sc}^{RB}$ for PUCCH format 3 or, if the PUCCH resource with PUCCH format 3 includes an orthogonal cover code with length $N_{SF}^{PUCCH,3}$ provided by occ-Length, $N_{sc,ctrl}^{RB} = N_{sc}^{RB}/N_{SF}^{PUCCH,3}$, and $N_{sc,ctrl}^{RB} = N_{sc}^{RB}/N_{SF}^{PUCCH,4}$ for PUCCH format 4, where $N_{sc}^{RB}$ is a number of subcarriers per resource block (e.g., as described in TS 38.211 v16.6.0);

$N_{symb-UCI}^{PUCCH}$ is equal to a number of PUCCH symbols $N_{syumb}^{PUCCH,2}$ for PUCCH format 2 provided by nrofSymbols in PUCCH-format2. For PUCCH format 3 or for PUCCH format 4, $N_{symb-UCI}^{PUCCH}$ equal to a number of PUCCH symbols $N_{symb}^{PUCCH,3}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively (e.g., as described in TS 38.211 v16.6.0);

$Q_m=1$ if pi/2-BPSK is the modulation scheme and $Q_m=2$ if QPSK is the modulation scheme as indicated by pi2BPSK for PUCCH format 3 or PUCCH format 4. For PUCCH format 2, $Q_m=2$.

If a UE has one or more CSI reports and zero or more HARQ-ACK/SR information bits to transmit in a PUCCH where the HARQ-ACK, if any, is in response to a PDSCH reception without a corresponding PDCCH, if any of the CSI reports are overlapping and the UE is provided by multi-CSI-PUCCH-ResourceList with J≤2 PUCCH resources in a slot, for PUCCH format 2 and/or PUCCH format 3 and/or PUCCH format 4, where the resources are indexed according to an ascending order for the product of a number of corresponding REs, modulation order $Q_m$, and configured code rate r;

if $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_0$, the UE uses PUCCH format 2 resource 0, or the PUCCH format 3 resource 0, or the PUCCH format 4 resource 0;

else if $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_j$ and $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_{j+1}$, $0 \leq j < J-1$, the UE transmits a PU conveying HARQ-ACK information, SR, and CSI report(s) in a respective PUCCH where the UE uses the PUCCH format 2 resource j+1, or the PUCCH format 3 resource j+1, or the PUCCH format 4 resource j+1;

else the UE uses the PUCCH format 2 resource J−1, or the PUCCH format 3 resource J−1, or the PUCCH format 4 resource J−1 and the UE selects $N_{CSI}^{reported}$ CSI report(s) for transmission together with HARQ-ACK information and SR, when any, in ascending priority value (e.g., as described in TS 38.214 v16.6.0);

else, the UE transmits the $O_{ACK}+O_{SR}+O_{CSI}+O_{CRC}$ bits in a PUCCH resource provided by pucch-CSI-ResourceList.

If a UE has HARQ-ACK, SR, and wideband or sub-band CSI reports to transmit and the UE determines a PUCCH resource with PUCCH format 2, or the UE has HARQ-ACK, SR, and wideband CSI reports (e.g., as described in TS 38.214 v16.6.0) to transmit and the UE determines a PUCCH resource with PUCCH format 3 or PUCCH format 4, where the UE determines the PUCCH resource using the PUCCH resource indicator field (e.g., as described in TS 38.212 v16.6.0) in a last of a number of DCI formats with a value of a PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, from a PUCCH resource set provided to the UE for HARQ-ACK transmission, and the UE determines the PUCCH resource set for $O_{UCI}$ UCI bits and if $(O_{ACK}+O_{SR}+O_{CSI\text{-}part1}+O_{CRC,CSI\text{-}part1}) \le M_{RB}^{PUCCH} \cdot N_{sc,ctrl}^{RB} \cdot N_{symb\text{-}UCI}^{PUCCH} \cdot Q_m \cdot r$, the UE transmits the HARQ-ACK, SR, and CSI reports bits by selecting the minimum number $M_{RB,min}^{PUCCH}$ of the $M_{RB}^{PUCCH}$ PRBs satisfying $(O_{ACK}+O_{SR}+O_{CSI\text{-}part1}+O_{CRC,CSI\text{-}part1}) \le M_{RB}^{PUCCH} \cdot N_{sc,ctrl}^{RB} \cdot N_{symb\text{-}UCI}^{PUCCH} \cdot Q_m \cdot r$;

else, the UE selects $N_{CSI}^{reported}$ CSI report(s), from the $N_{CSI}^{total}$ CSI reports, for transmission together with HARQ-ACK and SR in ascending priority value (e.g., as described in TS 38.214 v16.6.0), where the value of $N_{CSI}^{reported}$ satisfies $$\left( O_{ACK} + O_{SR} + \sum_{n=1}^{N_{CSI}^{reported}} O_{CSI-part1,n} + O_{CRC,CSI-part1,N} \right) \le M_{RB}^{PUCCH} \cdot N_{sc,ctrl}^{RB} \cdot N_{symb-UCI}^{PUCCH} \cdot Q_m \cdot r$$

and $$\left( O_{ACK} + O_{SR} + \sum_{n=1}^{N_{CSI}^{reported}+1} O_{CSI-part1,n} + O_{CRC,CSI-part1,N+1} \right) > M_{RB}^{PUCCH} \cdot N_{sc,ctrl}^{RB} \cdot N_{symb-UCI}^{PUCCH} \cdot Q_m \cdot r,$$

where $O_{CRC,CSI\text{-}part1,N}$ is a number of CRC bits corresponding to $$O_{ACK} + O_{SR} + \sum_{n=1}^{N_{CSI}^{reported}} O_{CSI-part1,n}$$

UCI bits, and $O_{CRC,CSI\text{-}part1,N+1}$ is a number of CRC bits corresponding to $$O_{ACK} + O_{SR} + \sum_{n=1}^{N_{CSI}^{reported}+1} O_{CSI-part1,n}$$

UCI bits.

If a UE is provided a first interlace of $M_{Interlace,0}^{PUCCH}$ PRBs by interlace0 in InterlaceAllocation, the UE has HARQ-ACK, SR, and wideband or sub-band CSI reports to transmit, and the UE determines a PUCCH resource with PUCCH format 2, or the UE has HARQ-ACK, SR, and wideband CSI reports to transmit and the UE determines a PUCCH resource with PUCCH format 3, where the UE determines the PUCCH resource using the PUCCH resource indicator field in a last of a number of DCI formats with a value of a PDSCH-to-HARQ_feedback timing indicator field indicating a same slot for the PUCCH transmission, from a PUCCH resource set provided to the UE for HARQ-ACK transmission, and the UE determines the PUCCH resource set for $O_{UCI}$ UCI bits, and if $(O_{ACK}+O_{SR}+O_{CSI\text{-}part1}+O_{CRC,CSI\text{-}part1}) \le M_{Interlace,0}^{PUCCH} \cdot N_{sc,ctrl}^{RB} \cdot N_{symb\text{-}UCI}^{PUCCH} \cdot Q_m \cdot r$, the UE transmits the HARQ-ACK, SR, and CSI reports bits in a PUCCH over the first interlace else, if the UE is provided a second interlace of $M_{Interlace,1}^{PUCCH}$ PRBs by interlace1 and if $(O_{ACK}+O_{SR}+O_{CSI\text{-}part1}+O_{CRC,CSI\text{-}part1}) \le (M_{Interlace,0}^{PUCCH}+M_{Interlace,1}^{PUCCH}) \cdot N_{sc,ctrl}^{RB} \cdot N_{symb\text{-}UCI}^{PUCCH} \cdot Q_m \cdot r$, the UE transmits the HARQ-ACK, SR, and CSI reports bits in a PUCCH over both the first and second interlaces, else, the procedure is the same as the corresponding one when the UE is provided PUCCH-ResourceSet by replacing $M_{RB}^{PUCCH}$ with $M_{Interlace,0}^{PUCCH}$, or if the UE is provided interlace1, by $M_{Interlace,0}^{PUCCH}+M_{Interlace,1}^{PUCCH}$.

If a UE has HARQ-ACK, SR, and sub-band CSI reports to transmit and the UE determines a PUCCH resource with PUCCH format 3 or PUCCH format 4, where the UE determines the PUCCH resource using the PUCCH resource indicator field (e.g., as described in TS 38.212 v16.6.0) in a last of a number of DCI formats with a value of a PDSCH-to-HARQ_feedback timing indicator field indicating a same slot for the PUCCH transmission, from a PUCCH resource set provided to the UE for HARQ-ACK transmission, and the UE determines the PUCCH resource set for $O_{UCI}$ UCI bits and if $(O_{ACK}+O_{SR}+O_{CSI}+O_{CRC}) \le M_{RB}^{PUCCH} \cdot N_{sc,ctrl}^{RB} \cdot N_{symb\text{-}UCI}^{PUCCH} \cdot Q_m \cdot r$, the UE transmits the HARQ-ACK, SR, and the $N_{CSI}^{total}$ CSI report bits by selecting the minimum number $M_{RB,min}^{PUCCH}$ of PRBs from the $M_{RB}^{PUCCH}$ PRBs satisfying $(O_{ACK}+O_{SR}+O_{CSI}+O_{CRC}) \le M_{RB,min}^{PUCCH} \cdot N_{sc,ctrl}^{RB} \cdot N_{symb\text{-}UCI}^{PUCCH} \cdot Q_m \cdot r$ else, if for $N_{CSI,part2}^{reported} > 0$ Part 2 CSI report priority value(s), it is $$\sum_{n=1}^{N_{CSI-part2}^{reported}} O_{CSI-part2,n} + O_{CRC,CSI-part2,N} \le \left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI-part1,n} + O_{CRC,CSI-part1} \right) / (Q_m \cdot r) \right] \right) \cdot Q_m \cdot r$$

and $$\sum_{n=1}^{N_{CSI-part2}^{reported}+1} O_{CSI-part2,n} + O_{CRC,CSI-part2,N+1} >$$

-continued $$\left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI-part1,n} + O_{CRC,CSI-part1} \right) / (Q_m \cdot r) \right] \right) \cdot Q_m \cdot r,$$

the UE selects the first $N_{CSI,part2}^{reported}$ Part 2 CSI reports, according to respective priority value(s) (e.g., as described in TS 38.214 v16.6.0), for transmission together with the HARQ-ACK, SR, and $N_{CSI}^{total}$ Part 1 CSI reports, where $O_{CSI-part1,n}$ is the number of Part 1 CSI report bits for the $n_{th}$ CSI report and $O_{CSI-part2,n}$ is the number of Part 2 CSI report bits for the $n_{th}$ CSI report priority value, $O_{CRC,CSI-part2,N}$ is a number of CRC bits corresponding to $$\sum_{n=1}^{N_{CSI-part2}^{reported}} O_{CSI-part2,n},$$

and $O_{CRC,CSI-part2,N+1}$ is a number of CRC bits corresponding to $$\sum_{n=1}^{N_{CSI-part2}^{reported}+1} O_{CSI-part2,n},$$

else, the UE drops all Part 2 CSI reports and selects $N_{CSI-part1}^{reported}$ Part 1 CSI report(s), from the $N_{CSI}^{total}$ CSI reports in ascending priority value (e.g., as described in TS 38.214 v16.6.0), for transmission together with the HARQ-ACK and SR information bits where the value of Nisi $N_{CSI-part1}^{reported}$ satisfies $$\left( O_{ACK} + O_{SR} + \sum_{n=1}^{N_{CSI-part1}^{reported}} O_{CSI-part1,n} + O_{CRC,CSI-part1,N} \right) \leq$$

$$M_{RB}^{PUCCH} \cdot N_{sc,ctrl}^{RB} \cdot N_{symb-UCI}^{PUCCH} \cdot Q_m \cdot r$$

and $$\left( O_{ACK} + O_{SR} + \sum_{n=1}^{N_{CSI-part1}^{reported}+1} O_{CSI-part1,n} + O_{CRC,CSI-part1,N+1} \right) >$$

$$M_{RB}^{PUCCH} \cdot N_{sc,ctrl}^{RB} \cdot N_{symb-UCI}^{PUCCH} \cdot Q_m \cdot r,$$

where $O_{CRC,CSI-part1,N}$ is a number of CRC bits corresponding to $$O_{ACK} + O_{SR} + \sum_{n=1}^{N_{CSI-part1}^{reported}} O_{CSI-part1,n}$$

UCI bits, and $O_{CRC,CSI-part1,N+1}$ is a number of CRC bits corresponding to $$O_{ACK} + O_{SR} + \sum_{n=1}^{N_{CSI-part1}^{reported}+1} O_{CSI-part1,n}$$

UCI bits.

If a UE is provided a first interlace of $M_{Interlace,0}^{PUCCH}$ PRBs by interlace0 in InterlaceAllocation, the UE has HARQ-ACK, SR, and sub-band CSI reports to transmit, and the UE determines a PUCCH resource with PUCCH format 3, where the UE determines the PUCCH resource using the PUCCH resource indicator field in a last of a number of DCI formats that have a value of a PDSCH-to-HARQ_feedback timing indicator field indicating a same slot for the PUCCH transmission, from a PUCCH resource set provided to the UE for HARQ-ACK transmission, and the UE determines the PUCCH resource set for $O_{UCI}$ UCI bits, and if $(O_{ACK}+O_{SR}+O_{CSI}+O_{CRC}) \leq M_{Interlace,0}^{PUCCH} \cdot N_{sc,ctrl}^{RB} \cdot N_{symb-UCI}^{PUCCH} \cdot Q_m \cdot r$, the UE transmits the HARQ-ACK, SR, and the Kr CSI report bits in a PUCCH over the first interlace else if the UE is provided a second interlace of $M_{Interlace,1}^{PUCCH}$ PRBs by interlace1 and if $(O_{ACK}+O_{SR}+O_{CSI}+O_{CRC}) \leq (M_{Interlace,0}^{PUCCH}+M_{Interlace,1}^{PUCCH}) \cdot N_{sc,ctrl}^{RB} \cdot N_{symb-UCI}^{PUCCH} \cdot Q_m \cdot r$, the UE transmits the HARQ-ACK, SR, and CSI reports bits in a PUCCH over both the first and second interlaces, else, the procedure is same as the corresponding one when the UE is provided PUCCH-ResourceSet by replacing $M_{RB}^{PUCCH}$ with $M_{Interlace,0}^{PUCCH}$, or, if the UE is provided interlace1, with $M_{Interlace,0}^{PUCCH}+M_{Interlace,1}^{PUCCH}$.

Code rate r corresponding to value of maxCodeRate is provided in Table 2.

TABLE 2

| maxCodeRate | Code rate r |
|---|---|
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Reserved |

Examples of some selected terms are provided as follows.

User Equipment (UE): The UE may be referred to as a PHY/MAC/RLC/PDCP/SDAP/RRC entity. The PHY/MAC/RLC/PDCP/SDAP/RRC entity may be referred to as a UE.

Network (NW): The NW may be a network node, a TRP, a cell (e.g., SpCell (Special Cell), PCell, PSCell, and/or SCell), an eNB, a gNB, and/or a base station.

Serving Cell: A PCell (Primary Cell), a PSCell, or an SCell (Secondary Cell). The serving cell may be an activated or a deactivated serving cell.

Special Cell (SpCell): For Dual Connectivity operation, the term Special Cell refers to the PCell of the MCG (Master Cell Group) or the PSCell of the SCG (Secondary Cell Group) depending on if the MAC entity is associated to the MCG or the SCG, respectively. Otherwise, the term Special Cell refers to the PCell. A Special Cell supports PUCCH (Physical Uplink Control CHannel) transmission and contention-based random access, and is always activated.

Prioritization and multiplexing rules for same-priority and/or different-priority PUCCH/PUSCH are introduced in Rel-16, and whether to support simultaneous PUCCH and PUSCH transmissions over different inter-band cells, or different intra-band cells, or a same cell is under discussion in Rel-17. The order to apply prioritization (or cancellation) and/or multiplexing while introducing the functionality of simultaneous PUCCH/PUSCH transmissions needs to be reconsidered, since the UE may drop a PUCCH or a PUSCH with a smaller priority index when a UL channel (e.g., PUCCH or PUSCH) with a smaller priority index overlaps with another UL channel (e.g., PUCCH or PUSCH) with a larger priority index in time domain in Rel-16. However, if simultaneous PUCCH and PUSCH transmissions over different inter-band cells, or different intra-band cells, or a same cell is supported, e.g., a UE is able to transmit PUCCH(s) and PUSCH(s) simultaneously, a PUCCH/PUSCH with a smaller priority index may be transmitted with a PUCCH/PUSCH with a larger priority index simultaneously over different inter-band cells, or over different intra-band cells, or over a same cell. The order to apply prioritization (or cancellation), and/or multiplexing, and/or simultaneous PUCCH/PUSCH transmissions also need to be determined. Different orders may cause different results while transmitting PUCCH and/or PUSCH. In some implementations, a UL channel with a larger priority index may mean that the UL channel has a higher priority to be transmitted than another UL channel with a smaller priority index.

If a UE is configured with a capability of inter-band CA and/or a capability of intra-band CA and at least one of the following conditions (1) to (5) of PUCCH and PUSCH transmission is/are met, a UE can be configured with a first parameter, by a gNB, related to the functionality of simultaneous PUCCH and PUSCH transmissions.

(1) PUCCH and PUSCH transmission are over different cells for inter-band;
(2) PUCCH and PUSCH transmission are over different cells for intra-band;
(3) PUCCH and PUSCH transmission are in a same cell;
(4) PUCCH and PUSCH have same priority (index); and
(5) PUCCH and PUSCH have different priority (index).

In some implementations, a UE may control (e.g., enable/activate/disable/deactivate/apply) the functionality of simultaneous PUCCH and PUSCH transmissions (of the same or different priority indexes) according to the first parameter. In some implementations, a UE may control (e.g., enable/activate/disable/deactivate/apply) the functionality of simultaneous PUCCH and PUSCH transmissions according to DCI and the first parameter.

If the first parameter is configured enable (or set to true), the UE may enable/activate the functionality of simultaneous PUCCH and PUSCH transmissions.

After the network configures the first parameter to a UE via RRC signaling, the DCI may be used to dynamically control (e.g., enable/activate/disable/deactivate/apply) the UE's functionality of simultaneous PUCCH and PUSCH transmissions. In some implementations, if the first parameter is configured to be enabled (or if the UE is with the capability of simultaneous PUCCH and PUSCH transmissions) and a first value is indicated in a DCI field in the DCI (e.g., 1), the UE may enable/activate the functionality of simultaneous PUCCH and PUSCH transmissions. In some implementations, if the first parameter is configured (or if the UE is with capability of simultaneous PUCCH and PUSCH transmissions) and a second value is indicated in a DCI field in the DCI (e.g., 0), the UE may disable/deactivate the functionality of simultaneous PUCCH and PUSCH transmissions. In some implementations, the DCI may be the same as the DCI for enabling/activating/disabling/deactivating/applying the functionality of multiplexing different-priority PUCCH and/or PUSCH. In some implementations, the DCI may be different from the DCI for enabling/activating/disabling/deactivating/applying the functionality of multiplexing different-priority PUCCH and/or PUSCH. In some implementations, if the first parameter is not configured, the UE may not be expected to receive the DCI.

In some implementations, the first parameter may be a parameter used to control (e.g., enable/activate/disable/deactivate/apply) the functionality of simultaneous PUCCH and PUSCH transmissions, where the PUCCH and PUSCH transmission may have the same or different priority indexes.

In some implementations, if a value of the first parameter of the functionality of simultaneous PUCCH and PUSCH transmissions of different priority indexes is true (or false), or if a value of the first parameter of the functionality of simultaneous PUCCH and PUSCH transmissions of different priority indexes is set to a first value, or if the first parameter is presented (or is provided, or is configured), the UE may perform a transmission of a PUCCH of larger priority index and a transmission of a PUSCH of a smaller priority index simultaneously (if the transmission of the PUCCH of larger priority index and the transmission of the PUSCH of smaller priority index overlap).

In some implementations, if a value of the first parameter of the functionality of simultaneous PUCCH and PUSCH transmissions of different priority indexes is true (or false), or if a value of the first parameter of the functionality of simultaneous PUCCH and PUSCH transmissions of different priority indexes is set to a first value, or if the first parameter is presented (or is provided, or is configured), the UE may perform a transmission of a PUCCH of smaller priority index and a transmission of a PUSCH of larger priority index simultaneously (if the transmission of the PUCCH of smaller priority index and the transmission of the PUSCH of larger priority index overlap).

In some implementations, if a value of the first parameter of the functionality of simultaneous PUCCH and PUSCH transmissions of different priority indexes is true (or false), or if a value of the first parameter of the functionality of simultaneous PUCCH and PUSCH transmissions of different priority indexes is set to a first value, or if the first parameter is presented (or is provided, or is configured), the UE may perform a transmission of a PUCCH and a transmission of a PUSCH, with different priority indexes, simultaneously (if the transmission of the PUCCH and the transmission of the PUSCH overlap).

In some implementations, if a value of the first parameter (represented as a Boolean function (True or False)) of the functionality of simultaneous PUCCH and PUSCH transmissions of different priority indexes is false (or true), or if the value of the first parameter is set to a second value, or if the first parameter is not presented (or is not provided, or is not configured), the UE may not perform a transmission of a PUCCH of a larger priority index and a transmission of a PUSCH of smaller priority index simultaneously (if the transmission of the PUCCH of larger priority index and the transmission of the PUSCH of smaller priority index overlap).

In some implementations, if a value of the first parameter (represented as a Boolean function (True or False)) of the functionality of simultaneous PUCCH and PUSCH transmissions of different priority indexes is false (or true), or if the value of the first parameter is set to a second value, or if the first parameter is not presented (or is not provided, or is not configured), the UE may not perform a transmission of a PUCCH of smaller priority index and a transmission of a PUSCH of a larger priority index simultaneously (if the transmission of the PUCCH of smaller priority index and the transmission of the PUSCH of larger priority index overlap).

In some implementations, if a value of the first parameter (represented as a Boolean function (True or False)) of the functionality of simultaneous PUCCH and PUSCH transmissions of different priority indexes is false (or true), or if the value of the first parameter is set to a second value, or if the first parameter is not presented (or is not provided, or is not configured), the UE may not perform a transmission of a PUCCH and a transmission of a PUSCH, with different priority indexes, simultaneously (if the transmission of the PUCCH and the transmission of the PUSCH overlap).

In the present disclosure, the overlapping of a PUCCH and a PUSCH may refer to the case that a PUCCH and a PUSCH partially/fully overlap with each other in the time domain.

In some implementations, if a value of the first parameter of the functionality of simultaneous PUCCH and PUSCH transmissions of the same priority index is true (or false), or if a value of the first parameter of the functionality of simultaneous PUCCH and PUSCH transmissions of the same priority index is set to a first value, or if the first parameter is presented (or is provided, or is configured), the UE may perform a transmission of a PUCCH and a transmission of a PUSCH, with the same or different priority indexes, simultaneously (if the transmission of the PUCCH and the transmission of the PUSCH overlap).

In some implementations, if a value of the first parameter of the functionality of simultaneous PUCCH and PUSCH transmissions of the same priority index is false (or true), or if a value of the first parameter of the functionality of simultaneous PUCCH and PUSCH transmissions of the same priority index is set to a second value, or if the first parameter is not presented (or is not provided, or is not configured), the UE may not perform a transmission of a PUCCH and a transmission of a PUSCH, with the same or different priority indexes, simultaneously (if the transmission of the PUCCH and the transmission of the PUSCH overlap).

In some implementations, if the UE is configured with an IE relating to logical-channel-based prioritization (e.g., lch-basedpriorization IE), and a value of the first parameter of the functionality of simultaneous PUCCH and PUSCH transmissions (with the same or different priority indexes) is presented or is set to a first value (e.g., true), the UE (or the MAC entity of the UE) may, upon determining that a PUSCH overlaps with a PUCCH for an SR transmission, consider the PUSCH to be a prioritized uplink grant and consider the PUCCH for SR transmission to be a prioritized PUCCH. Here, the LCH priority of the LCH that triggers the SR may be the same as or different from the LCH priority of the highest LCH among the LCHs that have been multiplexed or are to be multiplexed on a PDU for transmission on the PUSCH. That is, the UE may consider the PUSCH to be the prioritized uplink grant and consider the PUCCH for SR transmission to be a prioritized PUCCH regardless of the LCH priority. Subsequently, the MAC entity of the UE may instruct the lower layer (e.g., the PHY layer) to transmit the PUSCH and signal the SR on the PUCCH.

In contrast, if the UE is configured with the lch-basedpriorization IE, and a value of the first parameter of the functionality of simultaneous PUCCH and PUSCH transmissions (with the same or different priority indexes) is not presented or is set to a second value (e.g., false), the UE (or the MAC entity of the UE) may, upon determining that a PUSCH overlaps with a PUCCH for an SR transmission, consider the uplink grant/PUCCH for the SR transmission to be a prioritized uplink grant/PUCCH based on the LCH priority. For example, if the LCH priority of the LCH that triggers the SR is lower than the LCH priority of the highest LCH among the LCHs that have been multiplexed or are to be multiplexed on a PDU for transmission on the PUSCH, the MAC entity of the UE may consider the PUSCH to be a prioritized uplink grant and consider the PUCCH for SR to be a deprioritized PUCCH. Subsequently, the MAC entity of the UE may instruct the lower layer (e.g., PHY layer) to transmit the PUSCH and may not instruct a lower layer (e.g., PHY) to transmit the SR on the PUCCH.

In some implementations, a UE may control (e.g.; enable/activate/disable/deactivate/apply) the functionality of multiplexing the PUCCH and/or PUSCH with different priorities according to at least one of a second parameter and DCI.

If the second parameter is configured to be disabled (or true), the UE may disable (or deactivate) the functionality of multiplexing PUCCH and/or PUSCH with different priority.

After the network configures the second parameter to a UE via RRC signaling, the DCI may be used to dynamically control (e.g., enable/activate/disable/deactivate/apply) the functionality of multiplexing different-priority PUCCH and/or PUSCH. If the second parameter is configured to be disabled (or if the UE is not capable of multiplexing different-priority PUCCH and/or PUSCH) and a first value is indicated in a DCI field in the DCI (e.g., 0), the UE may disable (or deactivate) the functionality of multiplexing different-priority PUCCH and/or PUSCH. The DCI may be the same or different from the DCI as mentioned above for enabling/activating/disabling/deactivating/applying the functionality of simultaneous PUCCH and PUSCH transmissions. Moreover, if the second parameter is not configured, the UE may not be expected to receive the DCI.

The second parameter may be a parameter to control (e.g., enable/activate/disable/deactivate/apply) the functionality of multiplexing different-priority PUCCH and/or PUSCH. If a value of the second parameter is presented or is set to a first value (e.g., true), the UE may multiplex a transmission of a PUCCH of smaller priority index (or lower priority) with a transmission of a PUCCH of larger priority index (or higher priority) if the transmission of the PUCCH of smaller priority index overlaps with the transmission of the PUCCH of larger priority index. If a value of the second parameter is presented or is set to a first value (e.g., true), the UE may multiplex a transmission of a PUCCH of smaller priority index with a transmission of a PUSCH of larger priority index if the transmission of the PUCCH of smaller priority index overlaps with the transmission of the PUSCH of larger priority index. If a value of the second parameter is presented or is set to a first value (e.g., true), the UE may multiplex a transmission of a PUCCH of larger priority index with a transmission of a PUSCH of smaller priority index if the transmission of the PUCCH of larger priority index overlaps with the transmission of the PUSCH of smaller priority index. If a value of the second parameter is presented or is set to a first value (e.g., true), the UE may multiplex a transmission of a PUSCH of larger priority index with a transmission of a PUSCH of smaller priority index if the transmission of the PUSCH of larger priority index overlaps with the transmission of the PUSCH of smaller priority index.

If a value of the second parameter is not presented or is set to a second value (e.g., false), the UE may not multiplex multiple overlapping PUSCHs with different priorities. If a value of the second parameter is not presented or is set to a second value (e.g., false), the UE may not multiplex multiple overlapping PUCCHs with different priorities. If a value of the second parameter is not presented or is set to a second value (e.g., false), the UE may not multiplex multiple a PUSCH and a PUCCH with different priorities.

The first parameter may be signaled/transmitted by the network to the UE via dedicated RRC signaling (e.g., an RRC reconfiguration (e.g., RRCReconfiguration) message). The UE may enable/activate/disable/deactivate/apply the functionality of simultaneous PUCCH and/or PUSCH transmissions in response to receiving the dedicated RRC signaling.

The second parameter may be signaled/transmitted by the network to the UE via dedicated RRC signaling (e.g., RRCReconfiguration message). The UE may enable/activate/disable/deactivate/apply the functionality of multiplexing different PUCCH and/or PUSCH with different priorities in response to receiving the dedicated RRC signaling.

In some implementations, the UE may perform/apply a procedure of prioritization (or cancellation), multiplexing, and/or simultaneous PUCCH/PUSCH transmissions if at least one of the following conditions (1) to (3) is fulfilled:
(1) the UE enables/activates/applies the functionality of simultaneous PUCCH and PUSCH transmissions,
(2) the UE disables/deactivates the functionality of multiplexing different-priority PUCCH and/or PUSCH, and
(3) the UE disables/deactivates the functionality of multiplexing different-priority PUCCH and/or PUCCH.

During the procedure of prioritization (or cancellation), multiplexing, and/or simultaneous PUCCH/PUSCH transmissions, the UE may multiplex LP PUCCH(s) and/or determine a first PUCCH resource if LP PUCCH(s) transmissions overlap in time domain. Further, the UE may multiplex HP PUCCH(s) and/or determine a second PUCCH resource if HP PUCCH(s) transmissions overlap in time domain. HP PUCCH(s) may be prioritized over LP PUCCH(s) if LP PUCCH(s) and HP PUCCH(s) transmissions overlap in time domain, and/or if the first and the second PUCCH resource would overlap in time domain. Further, the UE may multiplex LP PUCCH(s) in LP PUSCH(s) if LP PUCCH(s) and LP PUSCH(s) transmissions overlap in time domain, and/or if the first PUCCH resource and LP PUSCH(s) transmission overlap in time domain. Further, the UE may multiplex HP PUCCH(s) in HP PUSCH(s) if HP PUCCH(s) and HP PUSCH(s) transmissions overlap in time domain, and/or if the second PUCCH resource and HP PUSCH(s) transmission overlap in time domain. After that, the UE may transmit perform certain UL channel transmissions (e.g., transmitting at least one of HP PUCCH(s), LP PUCCH(s), HP PUSCH(s), and LP PUSCH(s), or transmitting at least one of HP PUCCH(s), LP PUCCH(s), HP PUSCH(s), and LP PUSCH(s) in the same or different cell(s) simultaneously (in time domain), or transmitting at least one of HP PUCCH(s), LP PUCCH(s), HP PUSCH(s), and LP PUSCH(s).)

In some implementations, the UE may perform a procedure for handling an overlapping of PUCCH and/or PUSCH transmissions (including the corresponding repetitions, if any) with the same or different priority indexes (before considering slot configuration limitations for UE transmissions) if at least one of the following conditions (1) to (3) is fulfilled:
(1) the UE enables/activates/applies the functionality of simultaneous PUCCH and PUSCH transmissions (of different priority indexes) over different inter-band cells, or different intra-band cells, or a same cell;
(2) the UE disables/deactivates the functionality of multiplexing PUCCH and/or PUSCH transmissions of different priorities; and
(3) the UE disables/deactivates the functionality of multiplexing PUCCH and/or PUCCH/PUSCH of different priorities.

During the procedure for handling the overlapping of PUCCH and/or PUSCH transmissions, the UE may resolve an overlapping for one or more PUCCH transmission(s) of smaller priority index. A first PUCCH resource of smaller priority index may be determined/considered after resolving an overlapping for the one or more PUCCHs transmissions of smaller priority index. Further, the UE may resolve an overlapping for one or more transmission(s) of a PUCCH. (A second PUCCH resource of larger priority index may be determined/considered after resolving an overlapping for the one or more transmission(s) of a PUCCH of larger priority index.)

If a transmission of a PUCCH of a larger priority index (scheduled by a DCI format in a PDCCH reception) would overlap in time domain with a transmission of (or a repetition of) a PUCCH of smaller priority index, the UE may cancel the transmission of (or the repetition of) the PUCCH of smaller priority index (before the first symbol that would overlap with the transmission of the PUCCH of larger priority index) Alternatively, if a transmission of a PUCCH of larger priority index (scheduled by a DCI format in a PDCCH reception) would overlap in time domain with a transmission of (or a repetition of) a PUCCH of smaller priority index and the transmission of a PUCCH and the transmission of a PUSCH are transmitted over different intra/inter band cells, the UE may cancel the transmission of (or the repetition of) a PUCCH of smaller priority index, and the UE does not cancel the transmission of (or the repetition of) a PUSCH of smaller priority index (before the first symbol that would overlap with the transmission of the PUSCH of smaller priority index). Alternatively, if a transmission of a PUCCH of larger priority index (scheduled by a DCI format in a PDCCH reception) would overlap in time domain with a transmission of (or a repetition of) a PUCCH of smaller priority index and the transmission of a PUCCH and the transmission of a PUSCH are transmitted over a same cell, the UE may cancel the transmission of (or the repetition of) the PUCCH of smaller priority index, and the UE may not cancel (or may cancel) the transmission of (or the repetition of) a PUSCH of smaller priority index (before the first symbol that would overlap with the transmission of the PUSCH of smaller priority index).

If the first PUCCH resource of smaller priority index would overlap in time domain with a transmission of a PUSCH of smaller priority index, the UE may multiplex information in the first PUCCH resource in the transmission of the PUSCH of smaller priority index (and may not transmit SR). The information in the first PUCCH resource may include HARQ-ACK, and/or CSI report(s), and/or SR.

If the first PUCCH resource of larger priority index would overlap in time domain with a transmission of a PUSCH of larger priority index, the UE may multiplex information in the first PUCCH resource in the transmission of the PUSCH of larger priority index (and may not transmit SR). The information in the second PUCCH resource may include HARQ-ACK, and/or CSI report(s), and/or SR.

If a transmission of a PUCCH of larger priority index (scheduled by a DCI format in a PDCCH reception) would overlap in time domain with a transmission of (or a repetition of) a PUSCH of smaller priority index, and the transmission of PUCCH and the transmission of PUSCH are over different cells, the UE may transmit the PUSCH of smaller priority index (or the repetition thereof) and the PUCCH of larger priority index (scheduled by a DCI format in a PDCCH reception).

If a transmission of a PUSCH of larger priority index (scheduled by a DCI format in a PDCCH reception) would overlap in time domain with a transmission of (or a repetition of) a PUCCH of smaller priority index, and the transmission of PUCCH and the transmission of PUS CH are over different cells, the UE may transmit the PUSCH of larger priority index and the PUCCH of smaller priority index (or the repetition thereof) (scheduled by a DCI format in a PDCCH reception). Alternatively, if a transmission of a PUCCH of larger priority index (scheduled by a DCI format in a PDCCH reception) would overlap in time domain with a transmission of (or a repetition of) a PUSCH of smaller priority index, and the transmission of PUCCH and the transmission of PUSCH are over a same cell, the UE may transmit the PUSCH of smaller priority index and the PUCCH of larger priority index (or the repetition thereof) (scheduled by a DCI format in a PDCCH reception).

If a transmission of a PUSCH of larger priority index (scheduled by a DCI format in a PDCCH reception) would overlap in time domain with a transmission of (or a repetition of) a PUCCH of smaller priority index, and the transmission of PUCCH and the transmission of PUS CH are over a same cell, the UE may transmit the PUSCH of larger priority index (or the repetition thereof) and the PUCCH of smaller priority index (scheduled by a DCI format in a PDCCH reception), or the UE may transmit the PUSCH of larger priority index (or the repetition thereof) but not transmit the PUCCH of smaller priority index (scheduled by a DCI format in a PDCCH reception).

In some implementations, the UE may perform a procedure of handling an overlapping of PUCCH and/or PUSCH transmissions (including the corresponding repetitions if any,) with the same or different priority indexes (before considering slot configuration limitations for UE transmissions) if at least one of the following conditions is fulfilled:
 (1) the UE enables/activates/applies the functionality of simultaneous PUCCH and PUSCH transmissions (of the same priority index) over different inter-band cells, or different intra-band cells, or a same cell;
 (2) the UE disables/deactivates the functionality of multiplexing PUCCH and/or PUSCH transmissions of different priorities; and
 (3) the UE disables/deactivates the functionality of multiplexing PUCCH and/or PUCCH/PUSCH transmissions of different priorities.

During the procedure of handling the overlapping of PUCCH and/or PUSCH transmissions, the UE may resolve an overlapping for one or more PUCCH transmission(s) of smaller priority index, where a first PUCCH resource of smaller priority index may be determined/considered after resolving an overlapping for the one or more PUCCHs transmissions of smaller priority index. Further, the UE may resolve an overlapping for one or more transmission(s) of a PUCCH, where a second PUCCH resource of larger priority index may be determined/considered after resolving an overlapping for the one or more transmission(s) of a PUCCH of larger priority index.

If a transmission of a PUCCH of larger priority index (scheduled by a DCI format in a PDCCH reception) would overlap in time domain with a transmission of (or a repetition of) a PUCCH of smaller priority index, the UE may cancel the transmission of (or the repetition of) the PUCCH of smaller priority index (before the first symbol that would overlap with the transmission of the PUCCH of larger priority index).

If a transmission of a PUCCH of larger priority index (scheduled by a DCI format in a PDCCH reception) would overlap in time domain with a transmission of (or a repetition of) a PUSCH of smaller priority index, the UE may transmit the PUSCH of smaller priority index (or the repetition thereof) and the PUCCH of larger priority index (scheduled by a DCI format in a PDCCH reception).

If a transmission of a PUSCH of larger priority index (scheduled by a DCI format in a PDCCH reception) would overlap in time domain with a transmission of (or a repetition of) a PUSCH and/or a PUCCH of smaller priority index, the UE may transmit the PUSCH and/or the PUCCH of smaller priority index (or the repetition thereof) and the PUSCH of larger priority index (scheduled by a DCI format in a PDCCH reception).

In some implementations, the UE may perform a procedure of prioritization, cancellation, multiplexing, and/or simultaneous PUCCH/PUSCH transmissions if at least one of the following conditions (1) to (3) is fulfilled:
 (1) the UE enables/activates/applies the functionality of simultaneous PUCCH and PUS CH transmissions;
 (2) the UE disables/deactivates the functionality of multiplexing different-priority PUCCH and/or PUSCH; and
 (3) the UE disables/deactivates the functionality of multiplexing different-priority PUCCH and/or PUCCH.

During the procedure of prioritization, cancellation, multiplexing, and/or simultaneous PUCCH/PUSCH transmissions, the UE may multiplex same-priority PUCCH(s) (respectively) and/or determine a first PUCCH resource and/or a second PUCCH resource for LP PUCCH(s) and/or HP PUCCH(s), respectively, if one or more same-priority PUCCH(s) transmissions overlap in time domain. Further, HP PUCCH(s) may be prioritized over LP PUCCH(s) if LP PUCCH(s) and HP PUCCH(s) transmissions overlap in time domain, and/or if the first and the second PUCCH resource would overlap in time domain. Further, the UE may multiplex same-priority PUCCH(s) in PUSCH(s) if same-priority PUCCH(s) and PUSCH(s) transmissions overlap in time domain, and/or if the first PUCCH resource and LP PUSCH(s) transmission overlap in time domain, and/or if the second PUCCH resource and HP PUSCH(s) transmission overlap in time domain. After that, the UE may transmit HP PUCCH(s), LP PUCCH(s), HP PUSCH(s), and/or LP PUSCH(s), or transmit HP PUCCH(s), LP PUCCH(s), HP PUSCH(s), and/or LP PUSCH(s) in same or different cell(s) simultaneously (in time domain), or the UE may transmit HP PUCCH(s) and/or LP PUCCH(s), or HP PUSCH(s) and/or HP PUSCH(s).

In some implementations, the UE may perform a procedure of handling an overlapping for PUCCH and/or PUSCH transmissions (including repetitions if any,) with the same or different priority indexes (before considering slot configuration limitations for UE transmissions) if at least one of the following conditions (1) to (3) is fulfilled:
 (1) the UE enables/activates/applies the functionality of simultaneous PUCCH and PUSCH transmissions (of different priority indexes) over different inter-band cells, or different intra-band cells, or a same cell;

(2) the UE disables/deactivates the functionality of multiplexing PUCCH and/or PUSCH transmissions of different priorities; and (3) the UE disables/deactivates the functionality of multiplexing PUCCH and/or PUCCH/PUSCH of different priorities.

During the procedure of handling the overlapping for PUCCH and/or PUSCH transmissions, the following actions (a1) to (a6) may be performed:

(a1) The UE may resolve an overlapping for one or more PUCCH transmission(s) of smaller priority index, where a first PUCCH resource of smaller priority index may be determined/considered after resolving an overlapping for the one or more PUCCHs transmissions of smaller priority index.

(a2) The UE may resolve an overlapping for one or more PUCCH transmission(s) and a PUSCH transmission of smaller priority index, or the UE may resolve an overlapping for the first PUCCH resource and the PUSCH transmission of smaller priority index.

(a3) If a transmission of a PUCCH of larger priority index (scheduled by a DCI format in a PDCCH reception) would overlap in time domain with a transmission of (or a repetition of) a PUSCH and/or a PUCCH of smaller priority index, the UE may cancel the transmission of (or the repetition of) the PUSCH and/or the PUCCH of smaller priority index (before the first symbol that would overlap with the transmission of a PUCCH of larger priority index). If a transmission of a PUSCH of larger priority index (scheduled by a DCI format in a PDCCH reception) would overlap in time domain with a transmission of (or a repetition of) a PUCCH of smaller priority index, the UE may cancel the transmission of (or the repetition of) the PUCCH of smaller priority index (before the first symbol that would overlap with the transmission of the PUSCH of larger priority index).

(a4) The UE may resolve an overlapping for one or more transmission(s) of a PUCCH of larger priority index, where a second PUCCH resource of larger priority index may be determined/considered after resolving an overlapping for the one or more transmission(s) of the PUCCH of larger priority index.

(a5) The UE may resolve an overlapping for the one or more transmission(s) of a PUCCH of larger priority index and a transmission of a PUSCH of larger priority index, or the UE may resolve an overlapping for the second PUCCH resource and a PUSCH transmission of larger priority index.

(a6) If a transmission of a PUCCH (determined after action (a4) above) of larger priority index (scheduled by a DCI format in a PDCCH reception) would overlap in time domain with a transmission of (or a repetition of) a PUCCH of smaller priority index, the UE may cancel the transmission of (or the repetition of) the PUCCH of smaller priority index (before the first symbol that would overlap with the transmission of the PUCCH of larger priority index). If a transmission of the PUCCH of larger priority index (scheduled by a DCI format in a PDCCH reception) would overlap in time domain with a transmission of (or a repetition of) a PUSCH of smaller priority index, the UE may perform the transmission of (or the repetition of) the PUSCH of smaller priority index and the transmission of the PUCCH of larger priority index (scheduled by a DCI format in a PDCCH reception).

In some implementations, the order of above actions (a1) to (a6) may be considered while performing the procedure of handling the overlapping for PUCCH and/or PUSCH transmissions.

In some implementations, if the UE is not enabled/activated/applied with the functionality of simultaneous PUCCH and PUSCH transmissions, the UE may not perform action (a6) or the UE may cancel the transmission of a PUSCH of lower priority and/or the transmission of a PUCCH of lower priority.

In some implementations, the UE may perform a procedure of handling an overlapping for PUCCH and/or PUSCH transmissions (including repetitions, if any) with the same or different priority indexes (before considering slot configuration limitations for UE transmissions) if at least one of the following conditions (1) to (3) is fulfilled:

(1) the UE enables/activates/applies the functionality of simultaneous PUCCH and PUSCH transmissions (of different priority indexes) over different inter-band cells, or different intra-band cells, or a same cell;

(2) the UE disables/deactivates the functionality of multiplexing PUCCH and/or PUSCH transmissions of different priorities; and (3) the UE disables/deactivates the functionality of multiplexing PUCCH and/or PUCCH/PUSCH of different priorities.

During the procedure of handling the overlapping for PUCCH and/or PUSCH transmissions, the following actions (b1) to (b4) may be performed:

(b1) The UE may resolve an overlapping for one or more PUCCH and/or PUSCH transmission(s) of smaller priority index.

(b2) If a transmission of a PUCCH of larger priority index (scheduled by a DCI format in a PDCCH reception) would overlap in time domain with a transmission of (or a repetition of) a PUSCH and/or a PUCCH of smaller priority index, the UE cancels the transmission of (or the repetition of) the PUSCH and/or the PUCCH of smaller priority index (before the first symbol that would overlap with the transmission of the PUCCH of larger priority index). If a transmission of a PUSCH of larger priority index (scheduled by a DCI format in a PDCCH reception) would overlap in time domain with a transmission of (or a repetition of) a PUCCH of smaller priority index, the UE cancels the transmission of (or the repetition of) the PUCCH of smaller priority index (before the first symbol that would overlap with the transmission of the PUSCH of larger priority index).

(b3) The UE may resolve an overlapping for one or more PUCCH and/or PUSCH transmission(s) of larger priority index.

(b4) If a transmission of a PUCCH (determined after action (3) above) of larger priority index (scheduled by a DCI format in a PDCCH reception) would overlap in time domain with a transmission of (or a repetition of) a PUCCH of smaller priority index, the UE cancels the transmission of (or the repetition of) the PUCCH of smaller priority index (before the first symbol that would overlap with the transmission of the PUCCH of larger priority index). If a transmission of a PUCCH of larger priority index (scheduled by a DCI format in a PDCCH reception) would overlap in time domain with a transmission of (or a repetition of) a PUSCH of smaller priority index, the UE transmits the transmission of (or the repetition of) the PUSCH of smaller priority index and the transmission of the PUCCH of larger priority index (scheduled by a DCI format in a PDCCH reception).

In some implementations, the order of above actions (b1) to (b4) may be considered while performing the procedure of handling the overlapping for PUCCH and/or PUSCH transmissions.

In some implementations, if the UE is not enabled/activated/applied with the functionality of simultaneous PUCCH and PUSCH transmissions, the UE may not perform action (b4) above or the UE may cancel the transmission of the PUSCH of lower priority and/or the transmission of the PUCCH of lower priority.

In some implementations, the UE may perform a procedure of handling an overlapping for PUCCH and/or PUSCH transmissions (including repetitions, if any) with the same or different priority indexes (before considering slot configuration limitations for UE transmissions) if at least one of the following conditions (1) to (3) is fulfilled:
  (1) the UE enables/activates/applies the functionality of simultaneous PUCCH and PUSCH transmissions (of the same priority index) over different inter-band cells, or different intra-band cells, or a same cell;
  (2) the UE disables/deactivates the functionality of multiplexing PUCCH and/or PUSCH transmissions of different priorities; and
  (3) the UE disables/deactivates the functionality of multiplexing PUCCH and/or PUCCH/PUSCH of different priorities.

During the procedure of handling the overlapping for PUCCH and/or PUSCH transmissions, the following actions (c1) to (c6) may be performed:
  (c1) The UE may resolve an overlapping for one or more PUCCH transmission(s) of smaller priority index. A first PUCCH resource of smaller priority index may be determined/considered after resolving an overlapping for the one or more PUCCHs transmissions of smaller priority index.
  (c2) The UE may resolve an overlapping for one or more PUCCH transmission(s) and a PUSCH transmission of smaller priority index, or the UE may resolve an overlapping for the first PUCCH resource and a PUSCH transmission of smaller priority index.
  (c3) If a transmission of a PUCCH of larger priority index (scheduled by a DCI format in a PDCCH reception) would overlap in time domain with a transmission of (or a repetition of) a PUSCH and/or a PUCCH of smaller priority index, the UE cancels the transmission of (or the repetition of) the PUSCH and/or the PUCCH of smaller priority index (before the first symbol that would overlap with the transmission of the PUCCH of larger priority index). If a transmission of a PUSCH of larger priority index (scheduled by a DCI format in a PDCCH reception) would overlap in time domain with a transmission of (or a repetition of) a PUCCH of smaller priority index, the UE cancels the transmission of (or the repetition of) the PUCCH of smaller priority index (before the first symbol that would overlap with the transmission of the PUSCH of larger priority index).
  (c4) The UE may resolve an overlapping for one or more transmission(s) of a PUCCH of larger priority index. A second PUCCH resource of larger priority index may be determined/considered after resolving an overlapping for the one or more transmission(s) of the PUCCH of larger priority index.
  (c5) The UE may resolve an overlapping for the one or more transmission(s) of a PUCCH of larger priority index and a transmission of a PUSCH of larger priority index (or the UE may resolve an overlapping for the second PUCCH resource and the PUSCH transmission of larger priority index).
  (c6) If a transmission of a PUCCH (determined after action (c4) above) of larger priority index (scheduled by a DCI format in a PDCCH reception) would overlap in time domain with a transmission of (or a repetition of) a PUSCH or a PUCCH of smaller priority index, the UE transmits the PUSCH or the PUCCH of smaller priority index (or the repetition thereof) and the PUCCH of larger priority index (scheduled by a DCI format in a PDCCH reception).

In some implementations, the order of above steps (c1) to (c6) may be considered while performing the procedure of handling the overlapping for PUCCH and/or PUSCH transmissions.

In some implementations, if the UE is not enabled/activated/applied with the functionality of simultaneous PUCCH and PUSCH transmissions, the UE may not perform action (c6) or the UE may cancel the transmission of a PUSCH of lower priority and/or the transmission of a PUCCH of lower priority.

In some implementations, the UE may perform a procedure of handling an overlapping for PUCCH and/or PUSCH transmissions (including repetitions, if any) with the same or different priority indexes (before considering slot configuration limitations for UE transmissions) if at least one of the following conditions (1) to (3) is fulfilled:
  (1) the UE enables/activates/applies the functionality of simultaneous PUCCH and PUSCH transmissions (of different priority indexes) over different inter-band cells, or different intra-band cells, or a same cell;
  (2) the UE disables/deactivates the functionality of multiplexing PUCCH and/or PUSCH transmissions of different priorities; and
  (3) the UE disables/deactivates the functionality of multiplexing PUCCH and/or PUCCH/PUSCH of different priorities.

During the procedure of handling the overlapping for PUCCH and/or PUSCH transmissions, the following actions (d1) to (d4) may be performed:
  (d1) The UE may resolve an overlapping for one or more PUCCH and/or PUSCH transmission(s) of smaller priority index.
  (d2) If a transmission of a PUCCH of larger priority index (scheduled by a DCI format in a PDCCH reception) would overlap in time domain with a transmission of (or a repetition of) a PUSCH and/or a PUCCH of smaller priority index, the UE cancels the transmission of (or the repetition of) the PUSCH and/or the PUCCH of smaller priority index (before the first symbol that would overlap with the transmission of the PUCCH of larger priority index). If a transmission of a PUSCH of larger priority index (scheduled by a DCI format in a PDCCH reception) would overlap in time domain with a transmission of (or a repetition of) a PUCCH of smaller priority index, the UE cancels the transmission of (or the repetition of) the PUCCH of smaller priority index (before the first symbol that would overlap with the transmission of the PUSCH of larger priority index).
  (d3) The UE may resolve an overlapping for one or more PUCCH and/or PUSCH transmission(s) of larger priority index.

(d4) If a transmission of a PUCCH (determined after action (d3) above) of larger priority index (scheduled by a DCI format in a PDCCH reception) would overlap in time domain with a transmission of (or a repetition of) a PUSCH or a PUCCH of smaller priority index, the UE transmits the PUSCH or the PUCCH of smaller priority index (or the repetition thereof) and the PUCCH of larger priority index (scheduled by a DCI format in a PDCCH reception).

In some implementations, the order of above steps (d1) to (d4) may be considered while performing the procedure of handling the overlapping for PUCCH and/or PUSCH transmissions.

In some implementations, if the UE is not enabled/activated/applied with the functionality of simultaneous PUCCH and PUSCH transmissions, the UE may not perform action (d4) or the UE may cancel the transmission of a PUSCH of lower priority and/or the transmission of a PUCCH of lower priority.

In some implementations, the above-mentioned actions with other ordering may not be precluded. The one or more actions in a procedure may be omitted.

FIG. 1 is a flowchart of a wireless communication method 100 for performing logical-channel-based prioritization by a UE configured with a first IE relating to the logical-channel-based prioritization, according to an example implementation of the present disclosure. Although actions 102, 104, and 106 are illustrated as separate actions represented as independent blocks in FIG. 1, these separately illustrated actions should not be construed as necessarily order-dependent. The order in which the actions are performed in FIG. 1 is not intended to be construed as a limitation, and any number of the disclosed blocks may be combined in any order to implement the method, or an alternate method. Moreover, each of actions 102, 104, and 106 may be performed independently of other actions, and can be omitted in some implementations of the present disclosure.

In action 102, the UE may determine whether a PUCCH for an SR transmission overlaps a PUSCH. In action 104, the UE may determine whether the UE is configured with a second IE relating to a simultaneous transmission function of the PUCCH for the SR transmission and the PUSCH. In action 106, in a case that the PUCCH for the SR transmission overlaps the PUSCH, the UE may perform the logical-channel-based prioritization according to at least one of: whether the UE is configured with the second IE, and a value of the second IE, if the UE is configured with the second IE.

In some implementations, in a case that the UE is configured with the second 1E, the UE may perform the logical-channel-based prioritization at least by: considering the PUSCH as a prioritized uplink grant and considering the SR transmission as a prioritized SR transmission. In some implementations, the value of the second IE may be set to enable the simultaneous transmission function.

In some implementations, the UE may determine that a logical channel priority that triggers the SR transmission is lower than a logical channel priority of the PUSCH in the case that the PUCCH for the SR transmission overlaps the PUSCH.

In some implementations, in a case that the UE is not configured with the second IE, the UE may perform the logical-channel-based prioritization at least by: considering the PUSCH as a prioritized uplink grant and considering the SR transmission as a deprioritized SR transmission.

In some implementations, in a case that the UE is configured with the second 1E, and the value of the second IE is set to disable the simultaneous transmission function, the UE may perform the logical-channel-based prioritization at least by: considering the PUSCH as a prioritized uplink grant and considering the SR transmission as a deprioritized SR transmission.

In some implementations, the first IE may include (or refer to) an IE denoted as lch-basedpriorization (e.g., the lch-basedpriorization IE).

In some implementations, the second IE may include (or refer to) an IE denoted as simultaneousPUCCH-PUSCH (e.g., the simultaneousPUCCH-PUSCH IE).

In some implementations of the first aspect of the present disclosure, the wireless communication method further includes receiving a Radio Resource Control (RRC) message that configures the UE with the second IE.

Figure 2:
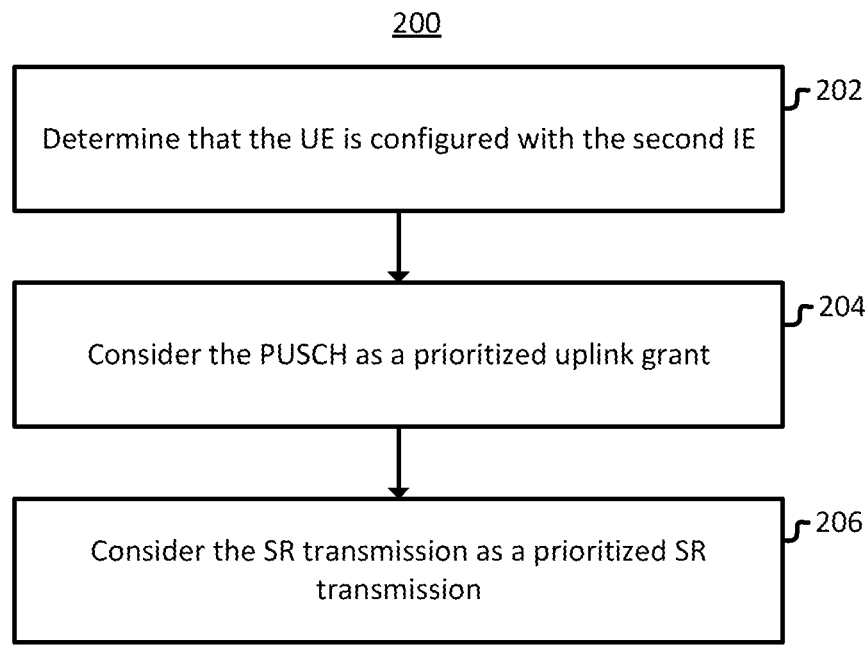
FIG. 2 is a flowchart of a procedure of logical-channel-based prioritization, according to an example implementation of the present disclosure.

FIG. 2 is a flowchart of a procedure 200 of logical-channel-based prioritization, according to an example implementation of the present disclosure. The procedure 200 may be independently performed by the UE or may be performed in combination with other method(s) described in the present disclosure (e.g., method 100, 300, and/or 400). Furthermore, although actions 202, 204, and 206 are illustrated as separate actions represented as independent blocks in FIG. 2, these separately illustrated actions should not be construed as necessarily order-dependent. The order in which the actions are performed in FIG. 2 is not intended to be construed as a limitation, and any number of the disclosed blocks may be combined in any order to implement the method, or an alternate method. For example, actions 204 and 206 may be performed in parallel, or the order of performing actions 204 and 206 may be reversed.

As described in action 106 of FIG. 1, in a case that the PUCCH for the SR transmission overlaps the PUSCH, the UE may perform the logical-channel-based prioritization according to whether the UE is configured with a second IE.

Procedure 200 may correspond to the case that the UE determines that the UE is configured with the second IE. As illustrated in FIG. 2, in action 202, the UE may determine that UE is configured with the second IE. In some implementations, the second IE may include (or refer to) an IE denoted as simultaneousPUCCH-PUSCH (e.g., the simultaneousPUCCH-PUSCH IE).

In action 204, the UE may consider (or determine) the PUSCH as a prioritized uplink grant.

In action 206, the UE may consider (or determine) the SR transmission as a prioritized SR transmission.

Since both the PUSCH and the SR transmission (or the corresponding PUCCH) are prioritized, they have higher priority to be transmitted than other UL channels, if any. Further, the UE may transmit the PUSCH and the SR transmission (or the corresponding PUCCH) simultaneously even if overlapping between the PUSCH and PUCCH occurs. In some implementations, the UE may obtain the MAC PDU to transmit from the Multiplexing and assembly entity.

Figure 3:
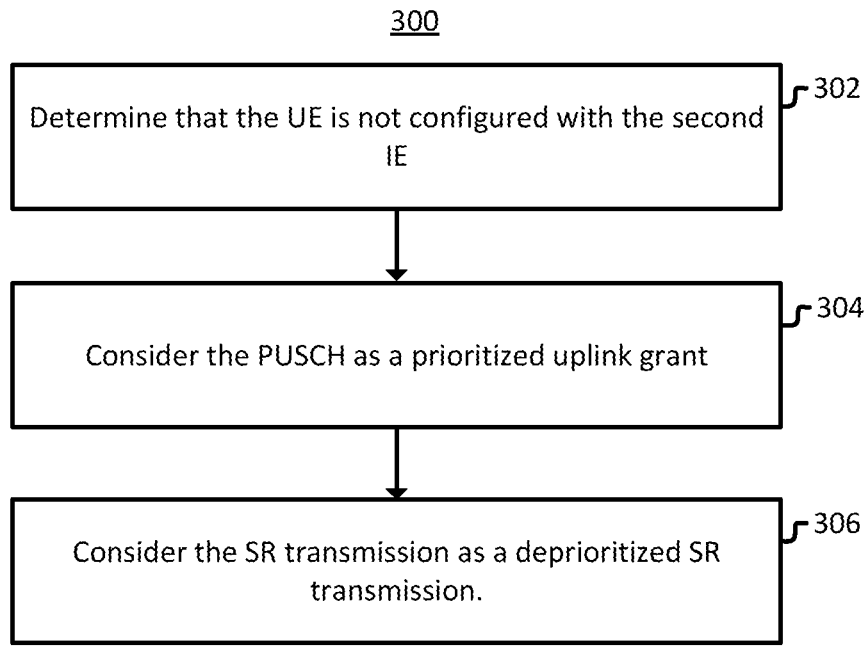
FIG. 3 is a flowchart of another procedure of logical-channel-based prioritization, according to an example implementation of the present disclosure.

FIG. 3 is a flowchart of a procedure 300 of logical-channel-based prioritization, according to an example implementation of the present disclosure. The procedure 300 may be independently performed by the UE or may be performed in combination with other method(s) described in the present disclosure (e.g., methods 100 and/or 200). Furthermore, although actions 302, 304, and 306 are illustrated as separate actions represented as independent blocks in FIG. 3, these separately illustrated actions should not be construed as necessarily order-dependent. The order in which the actions are performed in FIG. 3 is not intended to be construed as a limitation, and any number of the disclosed blocks may be combined in any order to implement the method, or an alternate method. For example, actions 304 and 306 may be performed in parallel, or the order of performing actions 304 and 306 may be reversed.

As described in action 106 of FIG. 1, in a case that the PUCCH for the SR transmission overlaps the PUSCH, the UE may perform the logical-channel-based prioritization according to whether the UE is configured with a second IE.

Procedure 300 may correspond to the case that the UE determines that the UE is not configured with the second IE. As illustrated in FIG. 3, in action 302, the UE may determine that the UE is not configured with the second IE. In some implementations, the second IE may include (or refer to) an IE denoted as simultaneousPUCCH-PUSCH (e.g., the simultaneousPUCCH-PUSCH IE).

In action 304, the UE may consider (or determine) the PUSCH as a prioritized uplink grant.

In action 306, the UE may consider (or determine) the SR transmission as a deprioritized SR transmission. In some implementations, once a UL transmission is deprioritized (e.g., the deprioritized SR transmission), the UE may not perform such a UL transmission and/or may consider such a UL transmission having a relatively lower priority than other overlapping UL transmissions.

Figure 4:
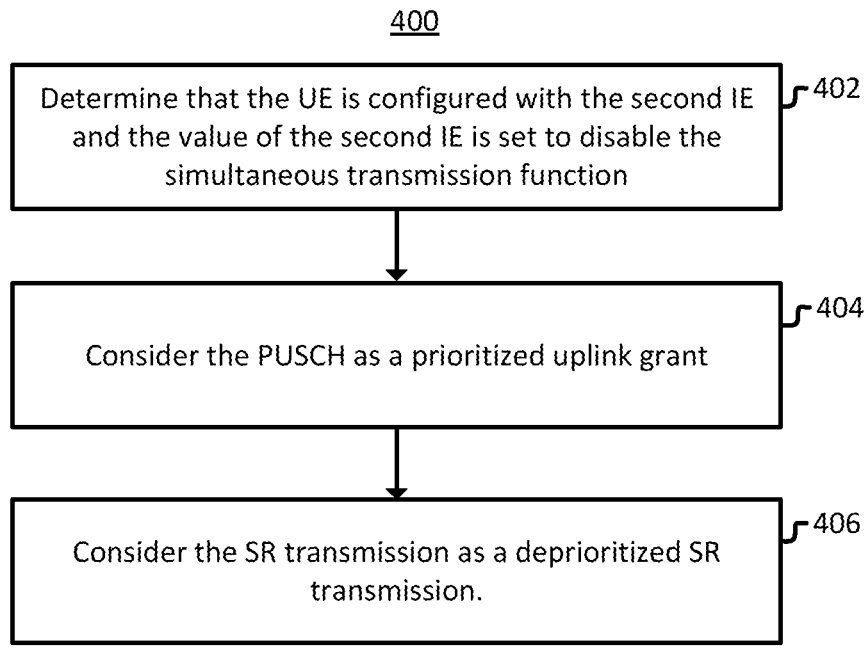
FIG. 4 is a flowchart of another procedure of logical-channel-based prioritization, according to an example implementation of the present disclosure.

FIG. 4 is a flowchart of a procedure 400 of logical-channel-based prioritization, according to an example implementation of the present disclosure. The procedure 400 may be independently performed by the UE or may be performed in combination with other method(s) described in the present disclosure (e.g., methods 100, 200, and/or 300). Furthermore, although actions 402, 404, and 406 are illustrated as separate actions represented as independent blocks in FIG. 4, these separately illustrated actions should not be construed as necessarily order-dependent. The order in which the actions are performed in FIG. 4 is not intended to be construed as a limitation, and any number of the disclosed blocks may be combined in any order to implement the method, or an alternate method. For example, actions 404 and 406 may be performed in parallel, or the order of performing actions 404 and 406 may be reversed.

As described in action 106 of FIG. 1, in a case that the PUCCH for the SR transmission overlaps the PUSCH, the UE may perform the logical-channel-based prioritization according to a value of the second IE.

As illustrated in FIG. 4, in action 402, the UE may determine that the UE is configured with the second IE and the value of the second IE is set to disable the simultaneous transmission function. In some implementations, the second IE may include (or refer to) an IE denoted as simultaneousPUCCH-PUSCH (e.g., the simultaneousPUCCH-PUSCH IE).

In action 404, the UE may consider (or determine) the PUSCH as a prioritized uplink grant.

In action 406, the UE may consider (or determine) the SR transmission as a deprioritized SR transmission. In some implementations, once a UL transmission is deprioritized (e.g., the deprioritized SR transmission), the UE may not perform such a UL transmission and/or may consider such a UL transmission having a relatively lower priority than other overlapping UL transmissions.

Figure 5:
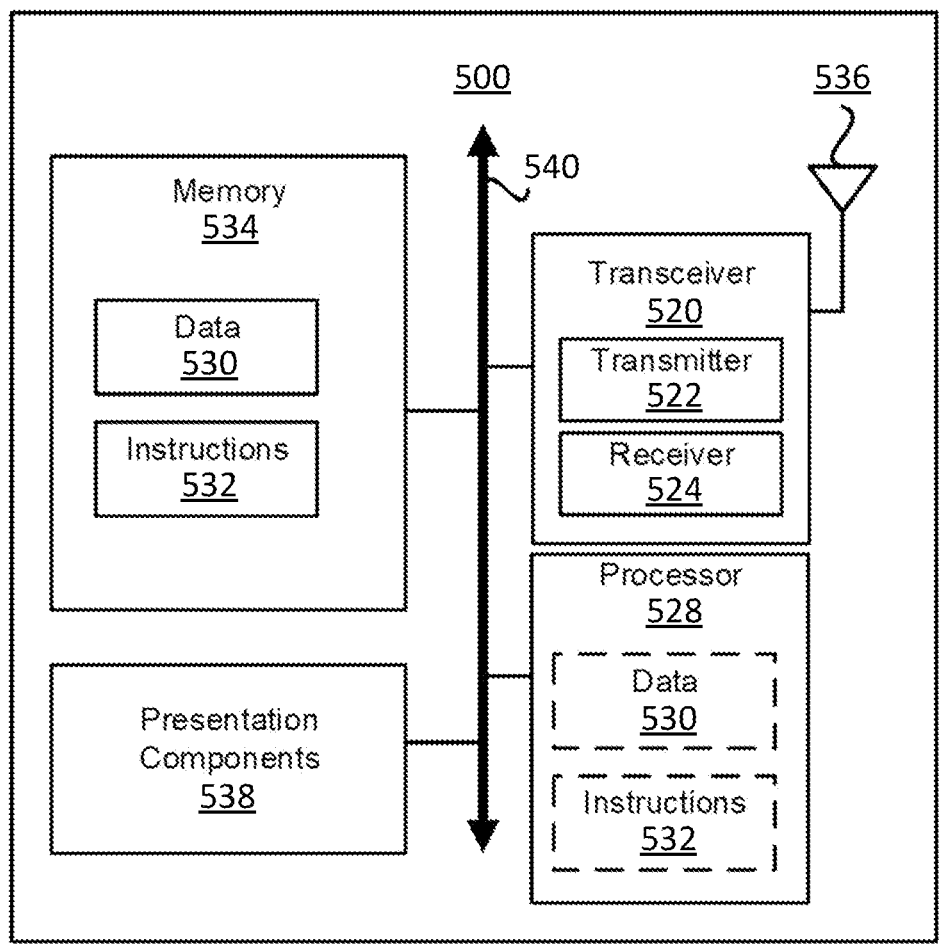
FIG. 5 is a block diagram illustrating a node for wireless communication, according to an example implementation of the present disclosure.

FIG. 5 is a block diagram illustrating a node 500 for wireless communication, according to an example implementation of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable program 532 (e.g., software codes or a set of instructions) that are configured to, when executed, cause the processor 528 to perform various functions disclosed herein, for example, with reference to FIGS. 1 through 4. Alternatively, the program 532 may not be directly executable by the processor 528 but may be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the program 532 received from the memory 538, and information transmitted and received via the transceiver 520, the baseband communications module, and/or the network communications module. The processor 528 may also process information to send to the transceiver 520 for transmission via the antenna 536 to the network communications module for transmission to a Core Network (CN).

One or more presentation components 538 may present data indications to a person or another device. Examples of presentation components 538 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method performed by a User Equipment (UE), the wireless communication method comprising:
   receiving a Radio Resource Control (RRC) message;
   determining whether a Physical Uplink Control Channel (PUCCH) overlaps a Physical Uplink Shared Channel (PUSCH) in time domain;
   determining whether a parameter is present in the RRC message, the parameter relating to a simultaneous transmission of the PUCCH and the PUSCH; and
   in response to determining that the PUCCH overlaps the PUSCH in the time domain, and that the parameter is present in the RRC message, performing a transmission of the PUCCH and a transmission of the PUSCH simultaneously during a time period in which the PUCCH overlaps the PUSCH in the time domain, wherein the transmission of the PUCCH and the transmission of the PUSCH are configured with a same priority index.

2. The wireless communication method of claim 1, wherein performing the transmission of the PUCCH and the transmission of the PUSCH simultaneously comprises:
   transmitting the PUCCH and the PUSCH on different cells.

3. A User Equipment (UE), comprising:
   at least one processor; and
   at least one non-transitory computer-readable medium coupled to the at least one processor and storing one or more computer-executable instructions that, when executed by the at least one processor, cause the UE to:
   receive a Radio Resource Control (RRC) message;
   determine whether a Physical Uplink Control Channel (PUCCH) overlaps a Physical Uplink Shared Channel (PUSCH) in time domain;
   determine whether a parameter is present in the RRC message, the parameter relating to a simultaneous transmission of the PUCCH and the PUSCH; and
   in response to determining that the PUCCH overlaps the PUSCH in the time domain, and that the parameter is present in the RRC message, perform a transmission of the PUCCH and a transmission of the PUSCH simultaneously during a time period in which the PUCCH overlaps the PUSCH in the time domain, wherein the transmission of the PUCCH and the transmission of the PUSCH are configured with a same priority index.

4. The UE of claim 3, wherein performing the transmission of the PUCCH and the transmission of the PUSCH simultaneously comprises:
   transmitting the PUCCH and the PUSCH on different cells.

* * * * *